Aug. 14, 1945.  P. E. FLOWERS ET AL  2,382,046
HYDRAULIC PRESS
Filed Feb. 23, 1942   10 Sheets-Sheet 1
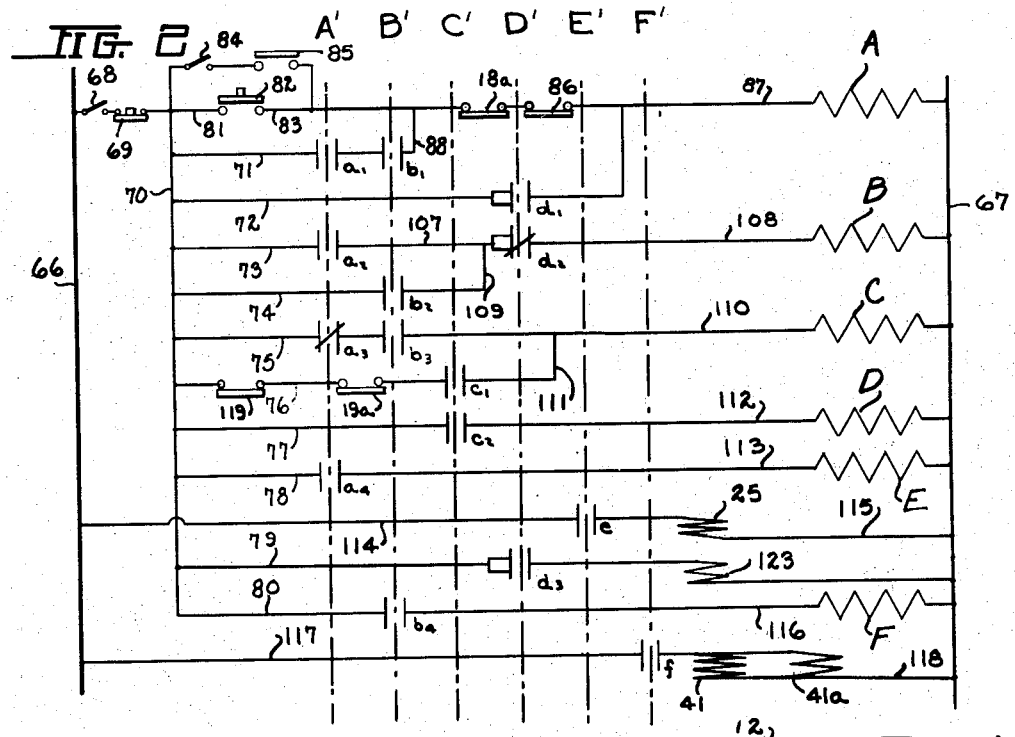
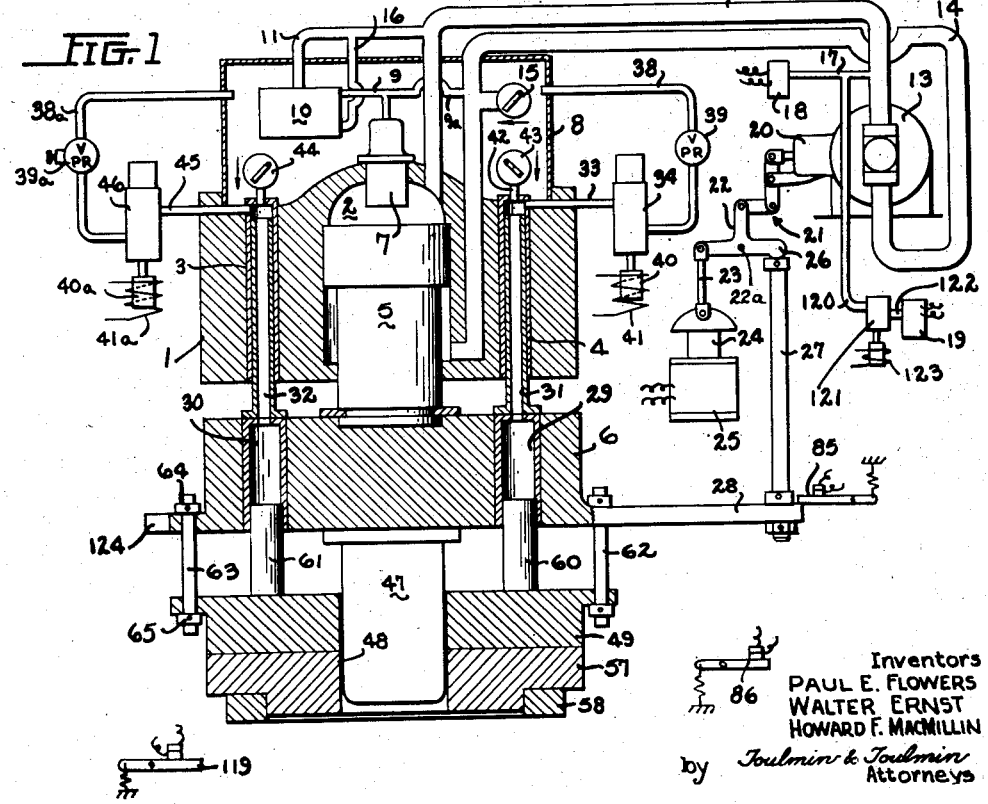
Inventors
PAUL E. FLOWERS
WALTER ERNST
HOWARD F. MACMILLIN
by Toulmin & Toulmin
Attorneys Aug. 14, 1945.
P. E. FLOWERS ET AL
2,382,046
HYDRAULIC PRESS
Filed Feb. 23, 1942
10 Sheets-Sheet 2
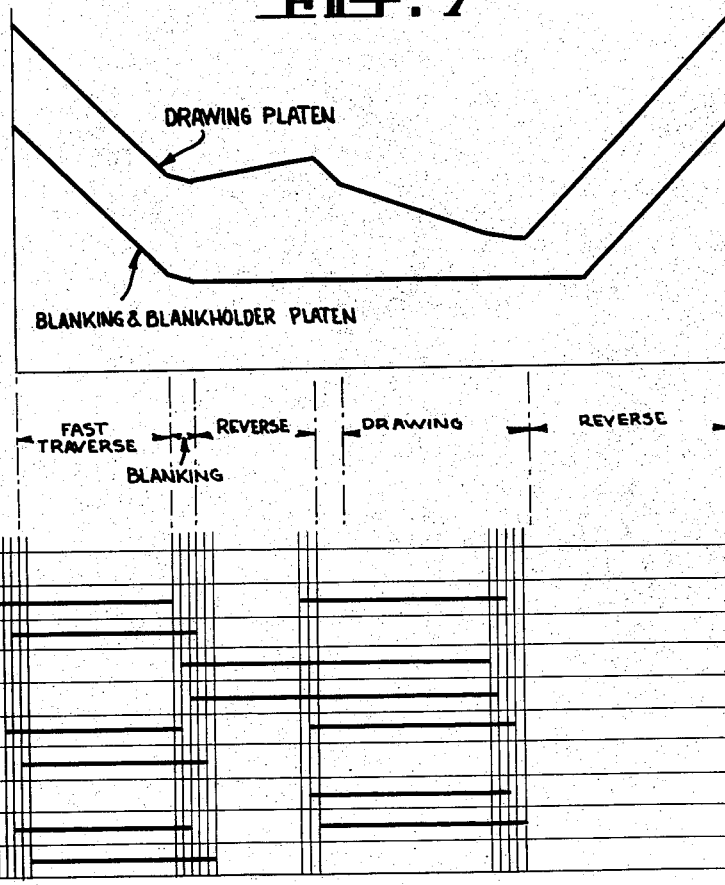
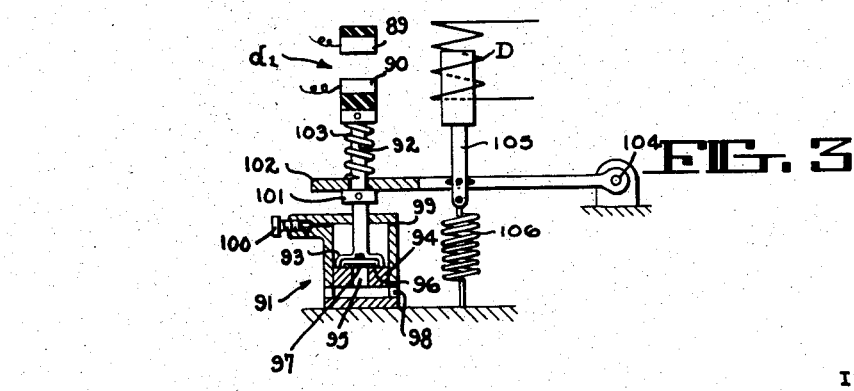
INVENTORS
PAUL E. FLOWERS
WALTER ERNST
HOWARD F. MacMILLIN
Toulmin & Toulmin
ATTORNEYS

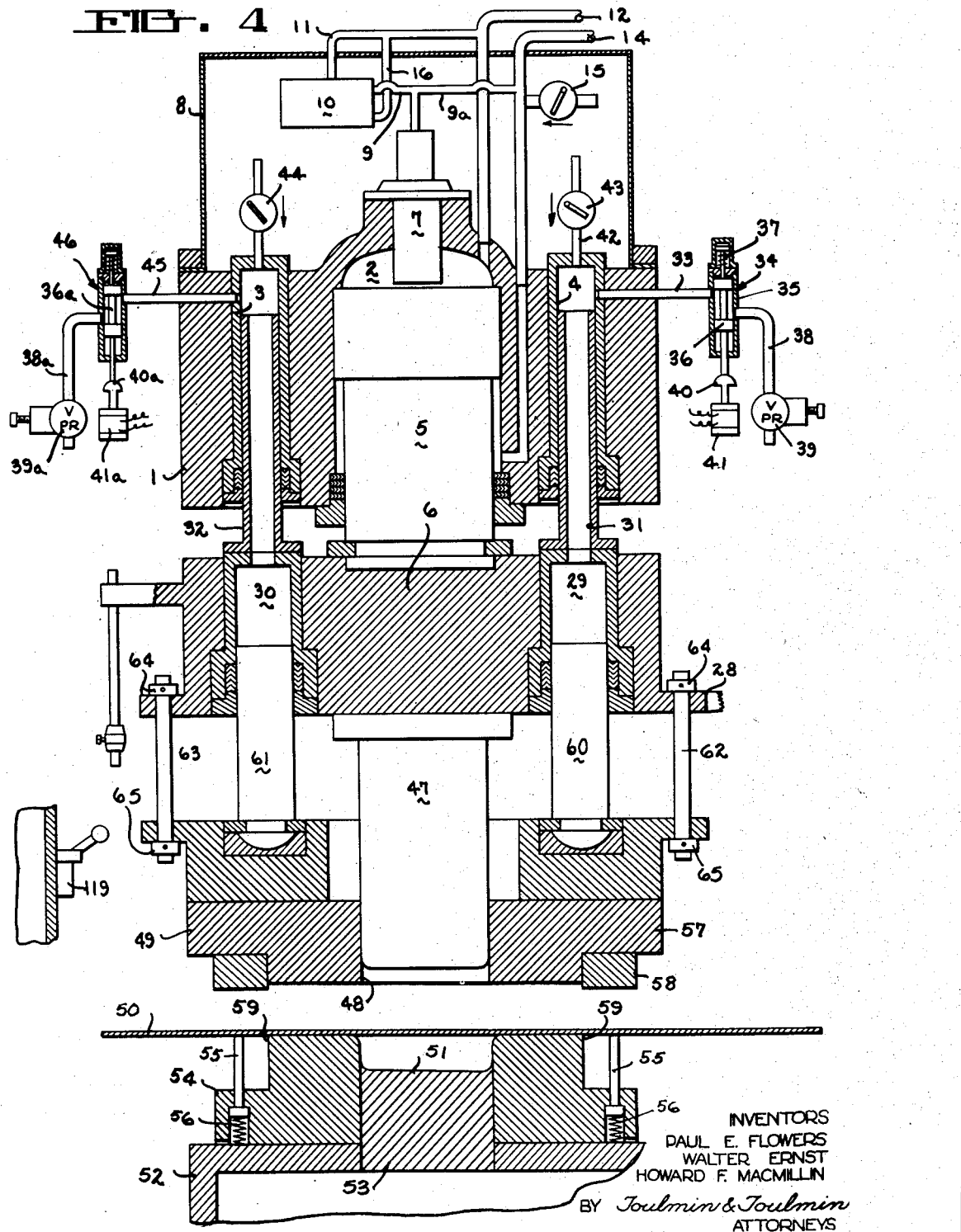

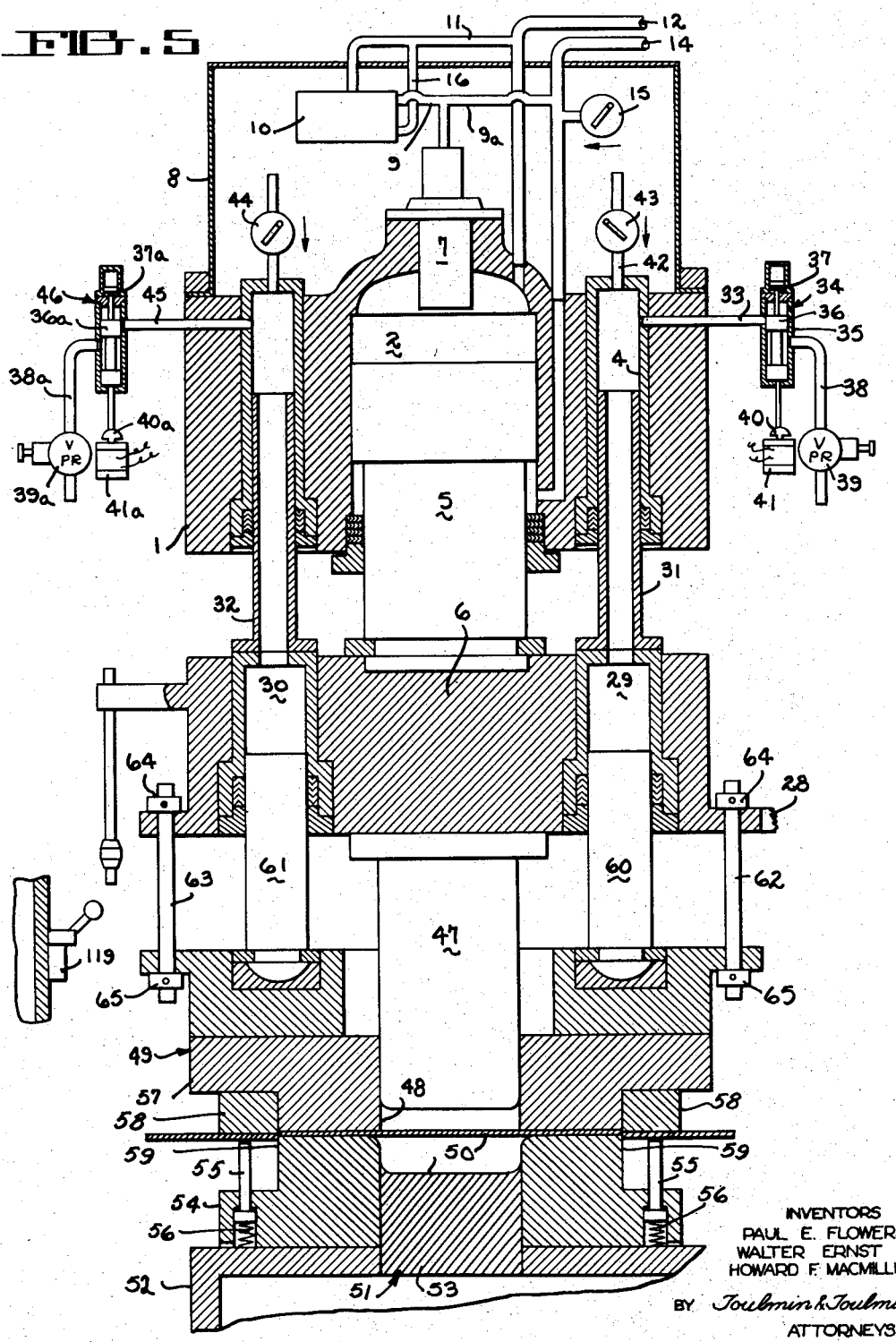

Aug. 14, 1945.   P. E. FLOWERS ET AL   2,382,046
HYDRAULIC PRESS
Filed Feb. 23, 1942   10 Sheets-Sheet 5

INVENTORS
PAUL E. FLOWERS
WALTER ERNST
HOWARD F. MACMILLIN
BY Toulmin & Toulmin
ATTORNEYS Aug. 14, 1945.  P. E. FLOWERS ET AL  2,382,046
HYDRAULIC PRESS
Filed Feb. 23, 1942   10 Sheets-Sheet 6

INVENTORS
PAUL E. FLOWERS
WALTER ERNST
HOWARD F. MACMILLIN
BY Toulmin & Toulmin
ATTORNEYS

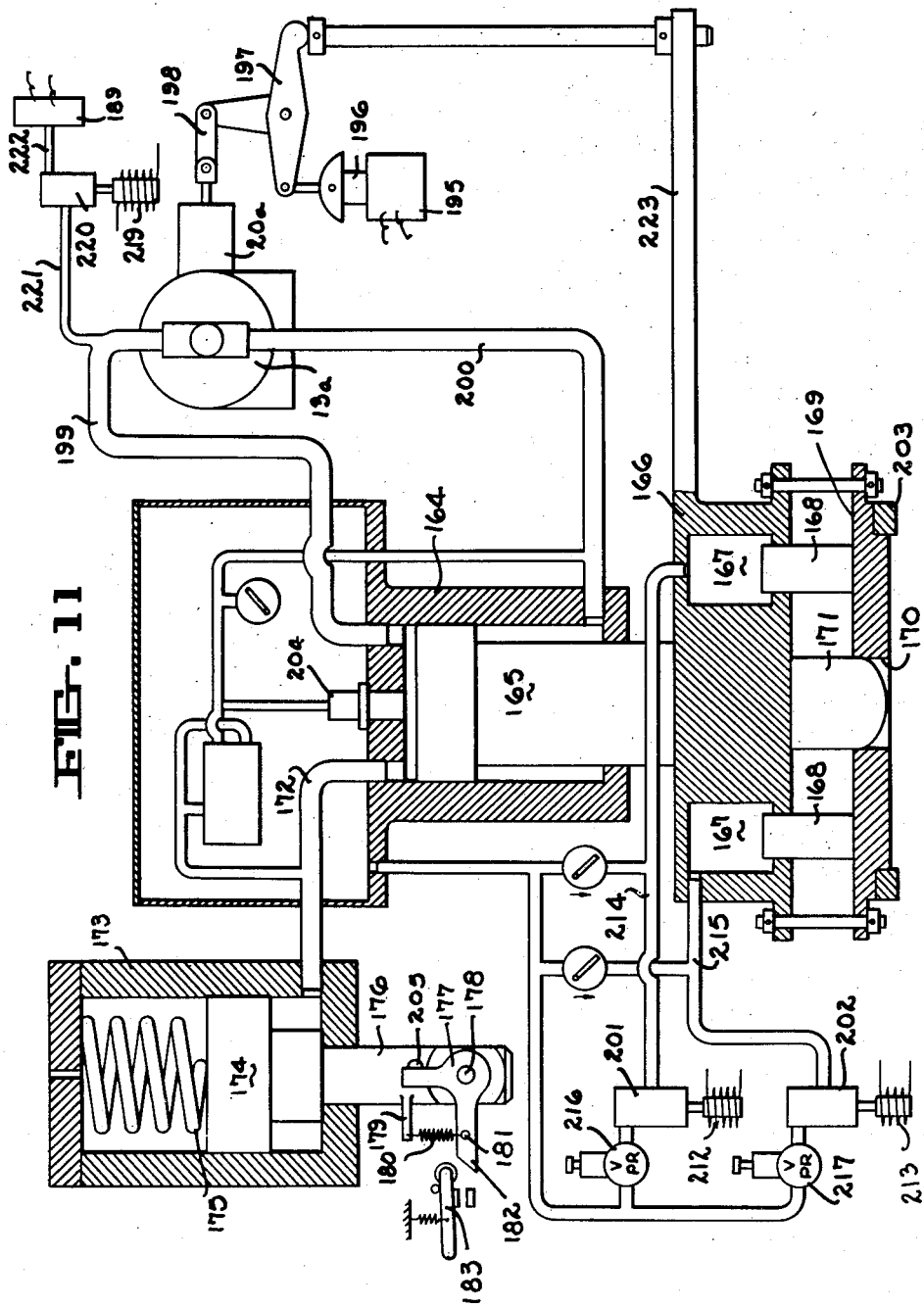

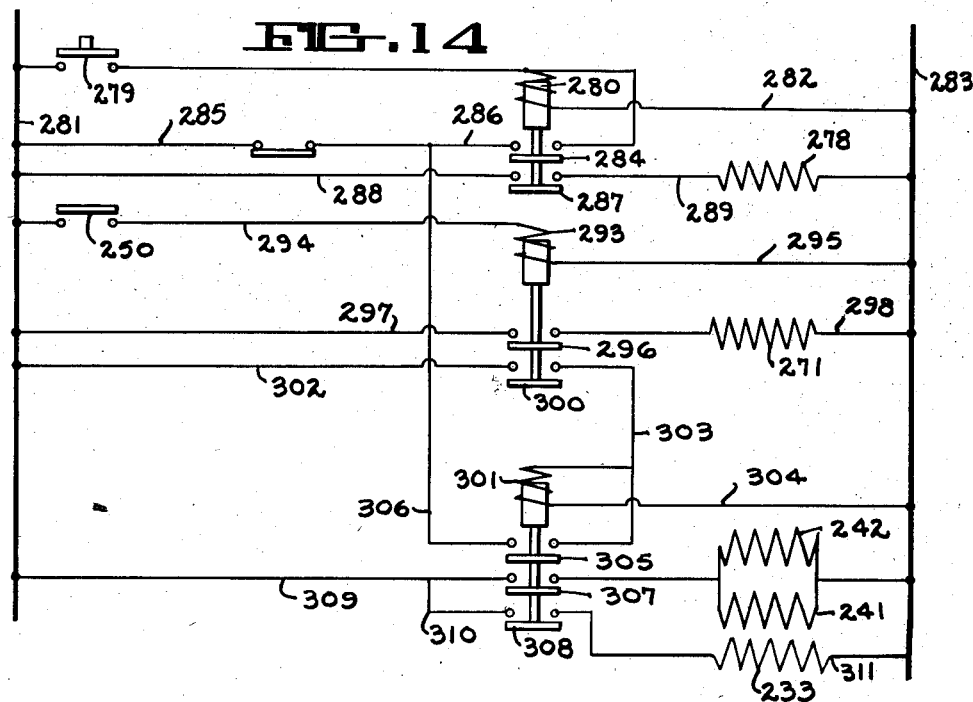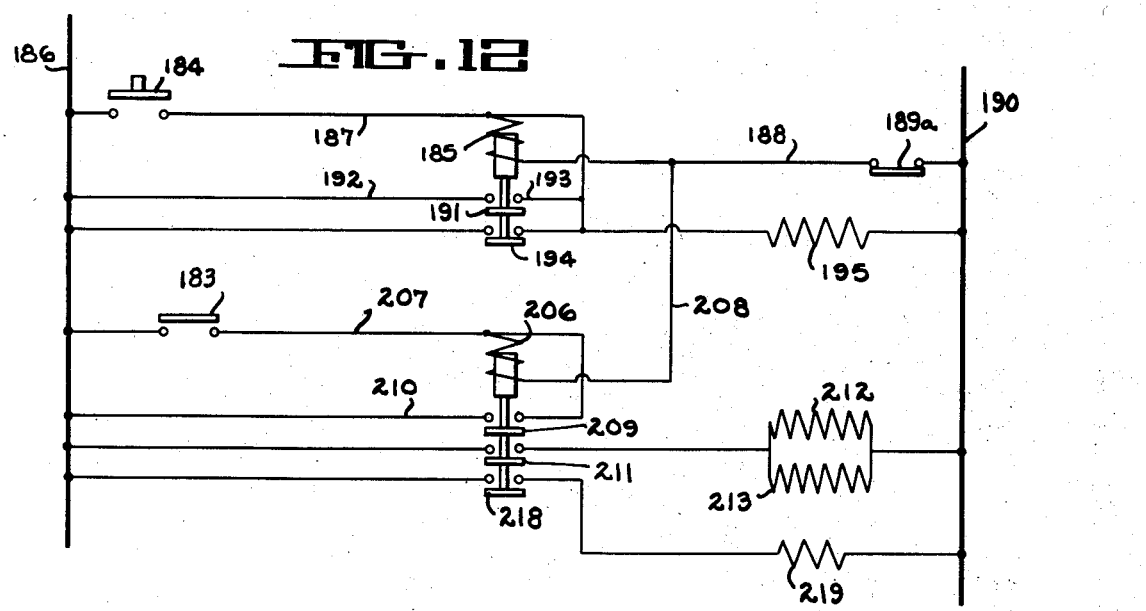

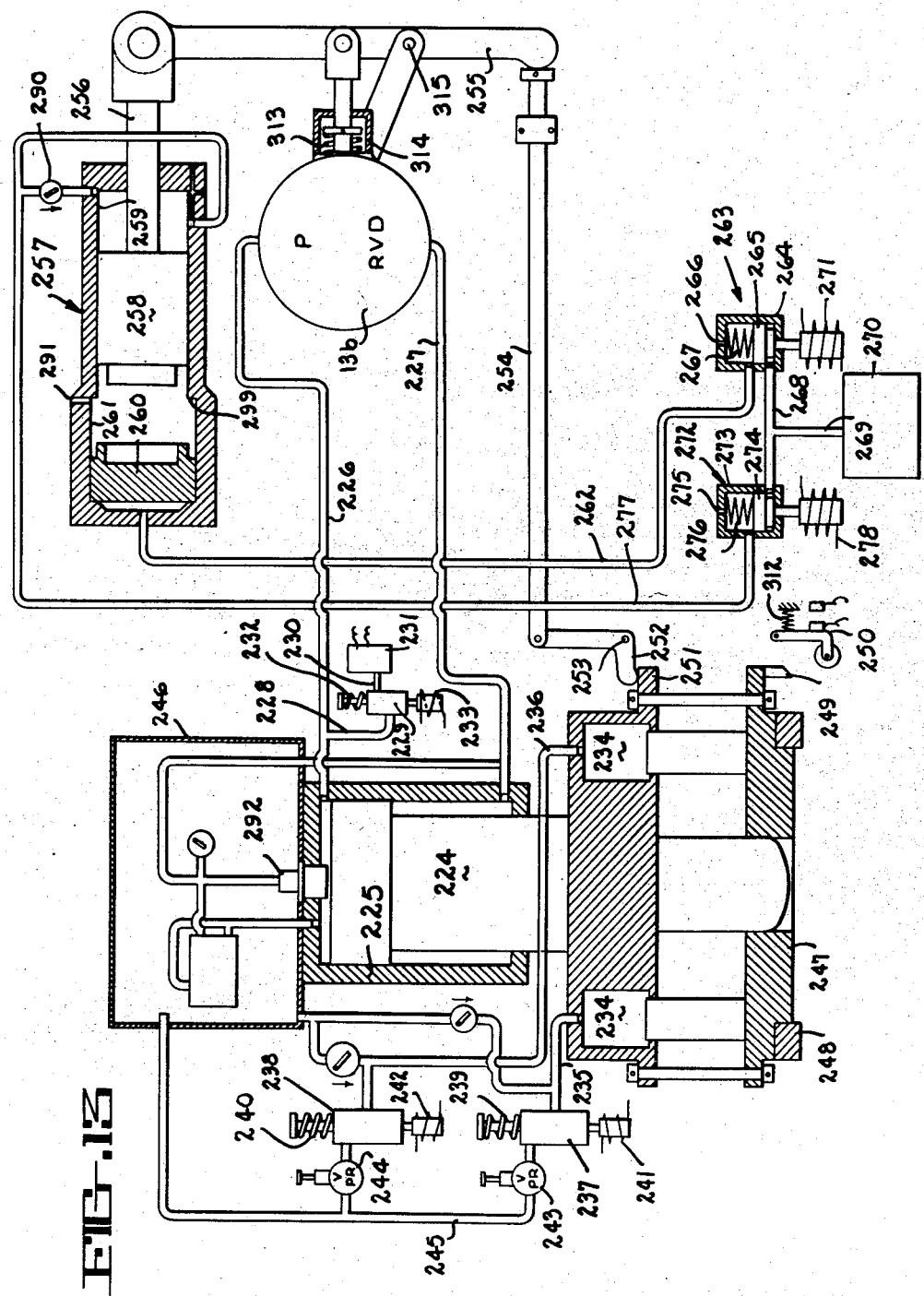

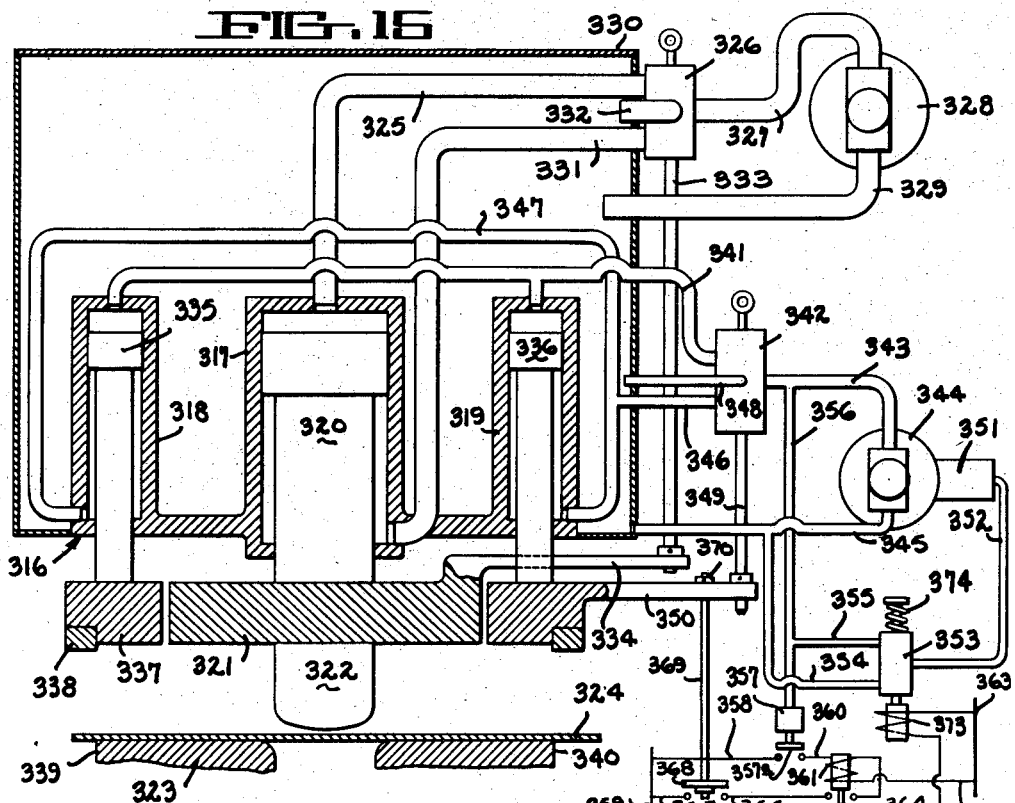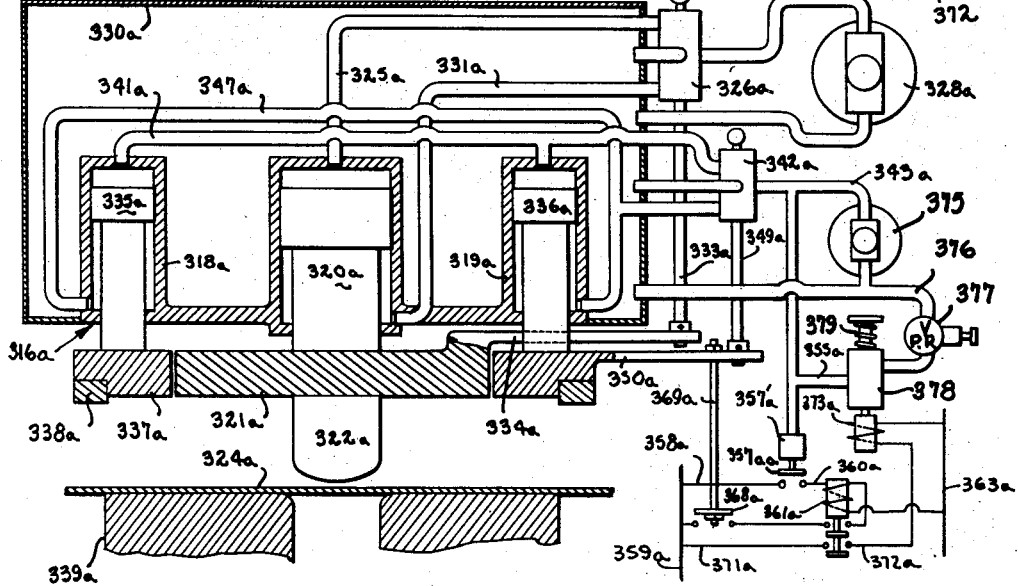

Patented Aug. 14, 1945

2,382,046

UNITED STATES PATENT OFFICE 2,382,046

HYDRAULIC PRESS

Paul E. Flowers, Shaker Heights, and Walter Ernst and Howard F. MacMillin, Mount Gilead, Ohio, assignors to The Hydraulic Development Corporation, Inc., Wilmington, Del., a corporation of Delaware Application February 23, 1942, Serial No. 432,028

16 Claims. (Cl. 113—42)

This invention relates to hydraulic machinery and, in particular, to hydraulic presses having drawing means for drawing a work piece, such as sheet metal, and blankholding means for holding the work piece while it is being drawn.

Heretofore, special machinery, such as a blanking or shearing press, was required to cut the work piece to its desired size before it was transferred to a drawing press for being drawn. Aside from the fact that such blanking or shearing presses are relatively expensive, considerable cost and time is involved to first blank or cut the work piece to size on one machine and then to transfer it to another machine for drawing the work piece.

Accordingly, it is an object of this invention to provide means which will make it possible to blank and draw a work piece on one and the same machine.

It is another object of the invention to provide a drawing press which will make it possible to blank and draw a work piece during one and the same working cycle.

Another object of the invention consists in the provision of a combined blanking and drawing press, which comprises means for automatically conditioning the press first for blanking and thereupon for drawing.

It is still another object to provide a hydraulic press having a drawing plunger and blankholder means, in which the blankholder means first actuates shearing means for cutting a blank to its desired size and thereupon holds the thus sized blank clamped for the actual drawing operation.

It is a still further object to provide a hydraulic press having a drawing plunger and blankholder means, in which the blankholder means is hydraulically locked to the drawing plunger for a predetermined portion of the working stroke thereof and is movable relative to said drawing plunger during the rest of the said working stroke.

These and other objects and advantages of the invention will appear more clearly from the following specification in connection with the accompanying drawings, in which:

Figure 1 diagrammatically illustrates a press according to the present invention.

Figure 2 is a simplified wiring diagram for the electric circuit associated with the press of Figure 1.

Figure 3 shows delaying means which may be used in connection with the press of Figure 1.

Figure 6:
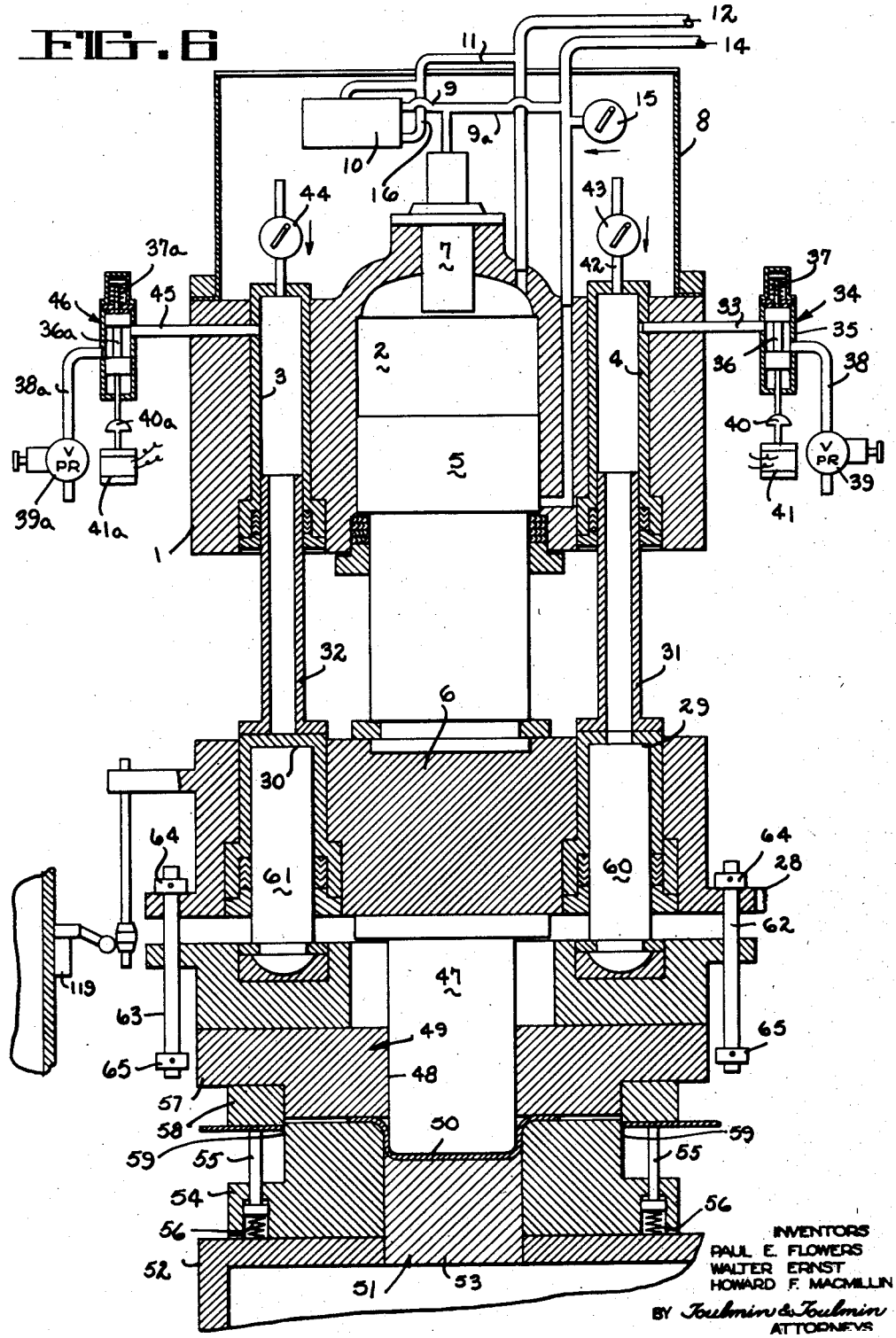

Figures 4, 5 and 6 indicate three different phases of operation of the press of Figure 1.

Figure 7 is a graph illustrating the operation of the drawing plunger and the blank holder.

Figure 8 is an energization chart showing, in connection with Figure 7, the periods of energization and deenergization of the various solenoids in Figure 2.

Figure 9:
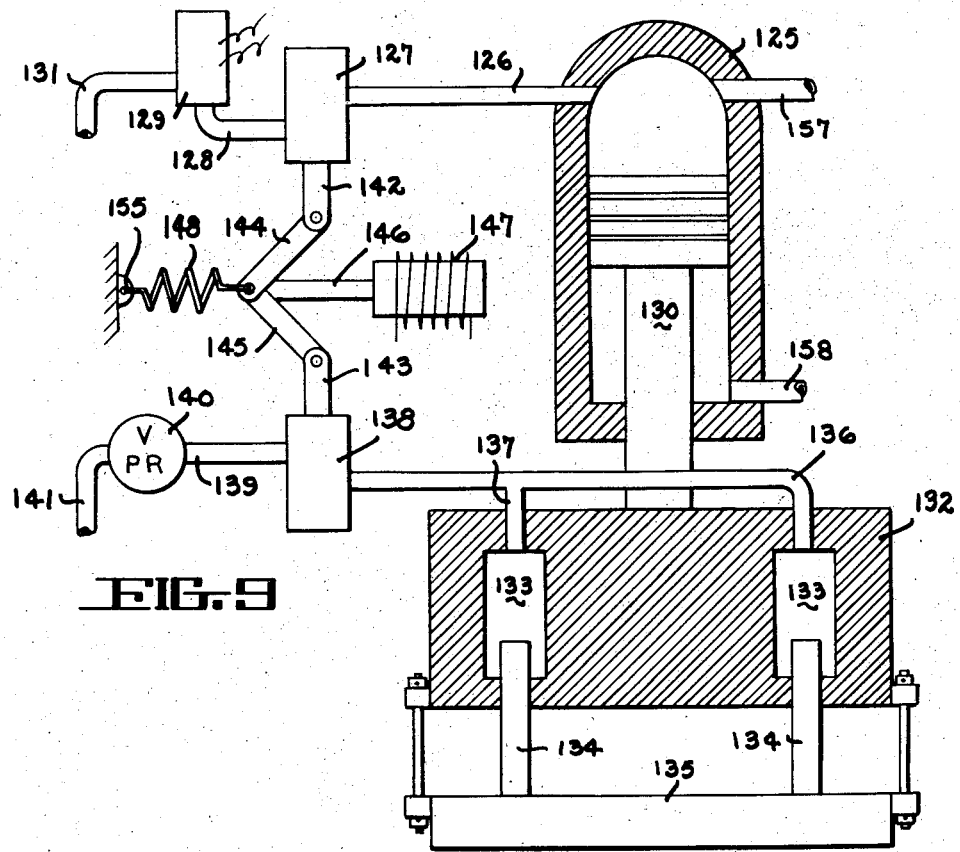

Figure 9 illustrates a modification of the present invention.

Figure 10:
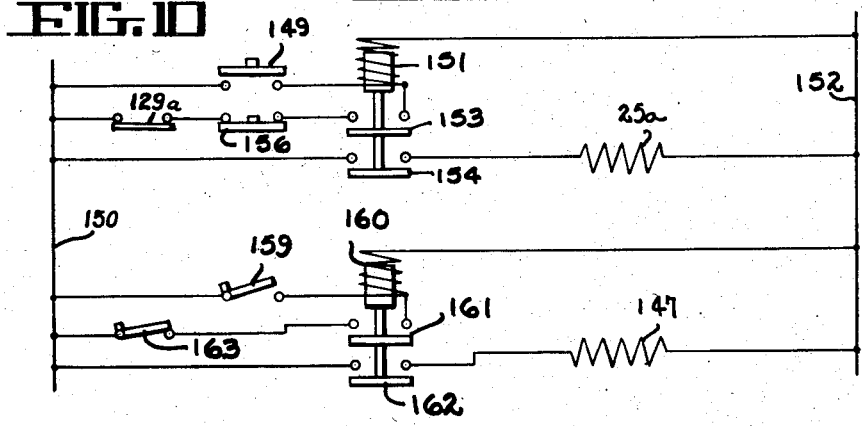

Figure 10 is a wiring diagram pertaining to the structure of Figure 9.

Figure 11 is another modification of the present invention.

Figure 12 is a wiring diagram pertaining to Figure 11.

Figure 13 shows a further modification of the present invention.

Figure 14 indicates the wiring diagram pertaining to Figure 13.

Figures 15 and 16 illustrate the present invention in connection with a drawing press having its blankholder means operable independently of the drawing means.

General arrangement

The present invention concerns a drawing press having a drawing plunger and blankholder means for holding the work piece during the drawing operation.

According to the invention, the blankholder means is adapted to cooperate with shearing means for blanking a work piece and is so controlled that, during a predetermined portion of the working stroke, the blankholder means actuates said shearing means to blank or cut a work piece to size, whereupon the blankholder means is brought into position for holding the thus blanked work piece during the drawing operation performed by the drawing plunger.

The invention applies to presses having blankholder means operable independently of the drawing plunger and also to presses in which the clamping pressure exerted upon the blankholder means is created by movement of the press plunger relative to said blankholder means. In presses having blankholder means operable independently of the drawing plunger, the blankholder means is first actuated at an increased pressure for performing the blanking operation, and is then held under a lower pressure to allow the desired slipping of the work piece during the drawing operation. In presses in which the clamping pressure exerted upon the blankholder means is created by movement of the drawing plunger relative to the blankholder means, the blankholder means and the drawing plunger are locked to each other for a predetermined travel of the drawing plunger to exert a predetermined high pressure upon the blankholder means for enabling the latter to effect the blanking operation.

As soon as the blanking operation is completed, or about to be completed, means become effective which allow a reduction in the pressure exerted upon the blankholder means, while permitting the latter to hold the work piece in clamped position and allowing the drawing plunger to move relative to said blankholder means.

Structural arrangement

Referring now to the drawings in detail and in particular to Figure 1 thereof, the press illustrated therein comprises a press head 1 having a main cylinder 2 and auxiliary cylinders 3 and 4.

Reciprocably mounted in the main cylinder 2 is a press ram 5 connected in any convenient manner with a main platen 6. Provided in the upper portion of the main cylinder 2 is a surge valve 7 extending into a fluid reservoir or surge tank 8. Connected with the surge valve 7 by means of a conduit 9 is a main cylinder release and pump by-pass valve 10. The surge valve 7 serves primarily for prefilling the main cylinder 2 when the ram 5 moves downwardly by gravity, whereas the main cylinder release and pump by-pass valve 10 is intended to release the pressure in the upper portion of the main cylinder 2 prior to the actual retraction stroke of the said ram to thereby facilitate the starting of said retraction stroke.

The valves 7 and 10 do not form a part of the present invention and for a more detailed description thereof reference may respectively be had to U. S. Patent No. 2,193,248 to Ernst and to the Ernst patent application, Serial No. 286,063, filed July 24, 1939.

Communicating with the valve 10 is a conduit 11 leading to a conduit 12 which, in its turn, has one end connected to the upper portion of the main cylinder 2, while the other end leads to one side of a reversible variable delivery pump 13, which pump may be of any standard design. The other side of the pump 13 communicates through a conduit 14 with the lower portion of the main cylinder 2 and comprises a check valve 15 adapted to admit fluid from the tank 8 into the conduit 14, while preventing the reverse flow. The conduit 9 is furthermore connected with the conduit 12 by means of conduit 9a. Branching off from the conduit 12 is a conduit 17 leading to a high tonnage control valve 18.

The pump 13 comprises a servomotor 20 operable by a link system, generally designated 21, for varying the stroke and, thereby, the delivery of the pump 13. The link system 21 comprises a three arm lever 22 shiftable about a pivot 22a. One arm of the lever 22 is connected by a link 23 with an armature 24 controlled by the pump solenoid 25. Another arm 26 of the three arm lever 22 is adapted to be engaged by a push rod 27 which, in its turn, is adjustably connected to the platen arm 28 carried by the main platen 6. The main platen 6 comprises clamping cylinders 29 and 30 which communicate through a hollow piston 31 and 32 respectively with the cylinders 4 and 3 in the press head 1.

Communicating with the cylinder 4 is a conduit 33 leading to a two-way valve 34 which latter comprises a casing 35 (see Figure 4) and a valve member 36 reciprocable in said casing. A spring 37 continuously urges the valve member 36 into its lower position in which it prevents communication of the conduit 33 with a conduit 38 comprising an adjustable pressure relief valve 39, of any standard design, and leading to the tank 8. Connected to the valve member 36 is an armature 40 which is controlled by a valve solenoid 41 in such a manner that energization of the solenoid 41 causes the valve member 36 to move into its upper position, thereby establishing fluid connection between the conduits 33 and 38.

The cylinder 4 also communicates through conduit 42 with a check valve 43 adapted to admit fluid from the tank 8 into the cylinder 4, while preventing the reverse flow.

The cylinder 3 likewise communicates with a check valve 44 for a similar purpose as the check valve 43. The cylinder 3 communicates through a conduit 45 with a two-way valve 46 which in its structure fully corresponds to that of the valve 34, so that the corresponding elements carry the same numerals, however, with the additional letter $a$. The valve 46 also communicates with a pressure relief valve 39a through a conduit 38a leading to the tank 8, while the valve member 36a is adapted to be controlled by a solenoid 41a.

The main platen 6 supports the drawing plunger 47 which is adapted to pass through the bore 48 in the blank holder 49 to shape a work piece 50 in cooperation with the die 51 supported by the press bed 52. The die 51 comprises a central member 53 surrounded by an outer member 54, which latter carries strippers 55 continuously urged upwardly by springs 56.

The blank holder 49 comprises a supporting member 57 carrying a shearing or blanking means 58 which, in cooperation with the edges 59 of the outer member 54, is adapted to blank or cut the work piece to size. The blank holder 49 also carries clamping pistons 60, 61 respectively reciprocable in the cylinders 29 and 30 of the main platen 6. The main platen 6 carries connecting rods 62, 63 which, by means of the collars 64, 65 adjustably mounted on the rods 62, 63, are adapted to hold the blank holder 49 suspended on the main platen 6 and to determine the maximum distance between said main platen and said blank holder.

The diagram of Figure 2 pertaining to the press of Figure 1 comprises a main supply line 66 and a number of contactor solenoids, A, B, C, D, E and F, having one end thereof connected to the main supply line 67. Each of the contactor solenoids controls one or more switches. To facilitate the reading of the diagram, the switch or switches controlled by each contactor solenoid is or are arranged in a vertical row numbered with the same letter as the respective contactor solenoid, however, with the exponent 1. The switches controlled by each contactor solenoid are designated with small letters corresponding to the capital letters of the contactor solenoids and are differentiated among each other by indices. As will be seen from Figure 2, for instance, the contactor solenoid A controls the switches $a_1$, $a_2$, $a_3$, and $a_4$, arranged in the vertical row $A^1$.

Connected with the main supply line 66 is a main switch 68 adapted, when closed, to connect the main supply line 66 with the normally closed safety switch 69. The switch 69 in its turn is connected with the line 70. The line 70 communicates through lines 71, 72, 73, 74, 75, 76, 77, 78, 79 and 80 respectively with the normally open switches $a_1$, $d_1$, $a_2$ and $b_2$, the normally closed switch $a_3$ and the normally closed limit switch 119 and the normally open switches $c_2$, $a_4$, $d_3$ and $b_4$. The line 70 communicates with a line 81 adapted, by closure of the starter switch 82, to be connected with the line 83. Arranged parallel to the switch 82 is a selector switch 84 and a repeat switch 85.

The line 83 is adapted to communicate through the switch blade 18a pertaining to the high tonnage control valve 18 with the position operated limit switch 86 which, in its turn, communicates through line 87 with the contactor solenoid A. The switch $a_1$ communicates with the switch $b_1$ which, in its turn, is connected through a line 88 with the line 83. The switch $d_1$ is adapted, when closed, to establish communication between the line 72 and the line 87. The switch $d_1$ comprises a stationary contact 89 (see Figure 3) and a movable contact 90, which has associated therewith a dash-pot arrangement, generally designated 91. The dash-pot arrangement 91 comprises a connecting rod 92 having a cup shaped end 93 connected to a piston 94 with a relatively large bore 95 therein. Reciprocable within the cup shaped end 93 and adapted to partially close on side of the bore 95 is a disc 96 with a small opening 97 therein. The piston 94 is reciprocable in a cylinder 98 having a small bleeder opening 99 therein and an adjustable needle valve 100.

The connecting rod 92 has adjustably mounted thereon a collar 101 adapted to engage a lever 102 which, in its turn, engages one end of a spring 103, the other end of which engages the contact 90. The lever 102 is pivoted about a pivot 104 and is pivotally connected to an armature 105 controlled by the contactor solenoid D. The armature 105 is continuously urged downwardly, with regard to Figure 3, by means of a spring 106.

The normally open switch $a_2$ is adapted to communicate with the normally closed switch $d_2$ by the line 107, while the normally closed switch $d_2$ is adapted to communicate through line 108 with the contactor solenoid B. The switch $d_2$ is also provided with a dash-pot arrangement which may be similar to the dash-pot arrangement of Figure 3 so as to delay the closing of the switch $c_2$, while allowing an immediate opening thereof. Branching off from the line 107 is a line 109 leading to the switch $b_2$.

The normally closed switch $a_3$ is adapted, by closure of the normally open switch $b_3$ to communicate with the line 110 leading to the contactor solenoid C. Branching off from the line 110 is a line 111 adapted by closure of the switch $c_1$ to communicate with the normally closed switch 19a pertaining to the low tonnage control valve 19.

The switch $c_2$, when closed, establishes electric connection between the line 77 and the line 112 leading to the contactor solenoid D. The switch $a_4$, when closed, establishes electric connection between the lines 78 and 113 leading to the contactor solenoid E. Connected to the main supply line 66 is a line 114 comprising the pump solenoid 25 and leading to the normally open switch e which, when closed, establishes electric connection between the lines 114 and 115 leading to the main supply line 67.

The switch $d_3$, when closed, establishes fluid connection between the line 79 and the solenoid 123 which, in its turn, is connected with the main supply line 67. The switch $d_3$ has a dash-pot arrangement, the structure of which may fully correspond to that shown in Figure 3 so that a further description thereof does not appear to be necessary. However, the delaying action of the dash-pot arrangement pertaining to the switch $d_3$ may be adjusted so as to be different from that of the switch $d_1$. The switch $b_4$ when closed, establishes electric connection between the lines 80 and 116 leading to the contactor solenoid F.

Also connected with the main supply line 66 is a line 117 comprising, in parallel arrangement, the valve solenoids 41 and 41a and leading to the normally open switch f which, when closed, establishes electric connection between the lines 117 and 118, which latter leads to the main supply line 67.

Referring now to Figures 7 and 8, Figure 7 has plotted on its abscissa the total distance over which the press ram and blankholder move during a complete cycle, while the speed of the press ram and blankholder, during this cycle, is plotted on the ordinate.

Figure 8 lists, in a vertical row, the starter switch and various solenoids of the circuit shown in Figure 2, while the horizontal rows show lines indicating the period over which the starter switch is closed and the solenoids are energized and deenergized. It will, for instance, be clear from Figure 8, in connection with Figure 7, that shortly after the closure of the starter switch 82, the solenoid A is energized and remains energized until the blanking operation is well under way. It will also be seen that the press ram and blankholder start moving only after the solenoid 25 has been energized, which solenoid stays energized slightly longer than the solenoid A.

To carry out a working cycle of the press shown in Figure 1, the operator inserts a work piece 50 between the outer member 54 and the shearing or blanking means 58, as shown in Figure 4, and then starts the pump 13 and closes the main switch 68 and also the starter switch 82. As a result thereof, current flows from the main supply line 66 through switches 68, 69 and 82, switch blade 18a, switch 86, line 87, contactor solenoid A and main supply line 67. In this way, contactor solenoid A is energized, which causes closure of the switches $a_1$, $a_2$, and $a_4$, while opening the normally closed switch $a_3$. Closure of the switch $a_1$ has no effect at this time, since the switch $b_1$ is still open. Closure of the switch $a_2$ establishes an energizing circuit for the contactor solenoid B, which comprises the main supply line 66, switches 68 and 69, lines 70, 72, switch $a_2$, normally closed switch $d_2$, line 108, contactor solenoid B and main supply line 67. Energization of the contactor solenoid B closes the switches $b_1$, $b_2$, $b_3$ and $b_4$.

Closure of the switch $b_1$ establishes a holding circuit for the contactor solenoid A, since the switch $a_1$ is closed at this time. This holding circuit comprises the main supply line 66, switches 68 and 69, line 70, switches $a_1$ and $b_1$, line 87, contactor solenoid A and main supply line 67. Closure of the switch $b_2$ has no additional effect at this time. Closure of the switch $b_3$ has likewise no effect, since the switch $a_3$ is open at this time.

Closure of switch $a_4$ establishes an energizing circuit for the contactor solenoid E, which energizing circuit comprises main supply line 66, switches 68 and 69, line 70, switch $a_4$, line 113, contactor solenoid E and main supply line 67. Energization of the contactor solenoid E causes closure of the switch e, thereby closing the energizing circuit for the pump solenoid 25, which energizing circuit comprises main supply line 66, line 114, pump solenoid 25, line 115 and main supply line 67.

Closure of the switch $b_4$ establishes an energizing circuit for the contactor solenoid F, which energizing circuit comprises main supply line 66, switches 68 and 69, line 70, switch $b_4$, line 116, contactor solenoid F and main supply line 67. Energization of the contactor solenoid F causes closure of the switch $f$, thereby closing the energizing circuit for the valve solenoids 41 and 41a, which circuit comprises main supply line 66, line 117, valves 41 and 41a, switch $f$ and main supply line 67.

Energization of the pump solenoid 25 causes the latter to move the armature 24 downwardly, thereby shifting the pump 13 by its link system 21 into full delivery forward stroke position, so that the pump delivers fluid through conduit 12 into the upper portion of the main cylinder 2, while withdrawing fluid from the lower portion thereof through conduit 14. The ram 5 and, thereby, also the main platen 6 and blankholder 49 move downwardly as fast as fluid is withdrawn from the lower portion of the main cylinder 2. In this way the ram 5 and blankholder 49 perform their fast traverse stroke, as correspondingly marked in Figure 7. Due to this downward movement, also the pistons 31 and 32 move downwardly and create a suction effect in the respective cylinders 4 and 3, which will cause the check valves 43 and 44 to admit fluid from the tank 8 into the cylinders 4 and 3 and from there into the clamping cylinders 29 and 30 respectively.

It should be noted that, due to the energization of the valve solenoids 41 and 41a, the respective valve members 36 and 36a have been moved downwardly into the position shown in Figure 5, in which they interrupt fluid connection of the cylinders 4 and 3 with the tank 8 through the respective valves 34 and 46. During the downward movement of the ram 5 described thus far, the surge valve 7 is open and admits fluid from the tank 8 into the upper portion of the main cylinder 2.

As soon as the shearing or blanking means 58 contacts the work piece 50, pressure begins to build up in the upper portion of the main cylinder 2, which pressure closes the surge valve 7. Furthermore, the ram 5 and, thereby, the main platen 6 begin to move relative to the blankholder 49 and, thereby, also to the pistons 60 and 61 connected thereto with the result that the pressure in the clamping cylinders 29 and 30 causes the check valves 43 and 44 to close. Since, on the other hand, the fluid in the cylinders 29 and 30 is now trapped (as previously mentioned, the valve members 36 and 36a are in the position shown in Figure 5), the ram 5 and the blankholder 49, as well as the shearing or blanking means 58 connected thereto, are hydraulically interlocked, and the full pressure exerted upon the ram 5 is conveyed to the shearing or blanking means 58, which now cuts the work piece 50, as indicated in Figure 5.

When, during this blanking operation, a predetermined high pressure is built up in the upper portion of the press cylinder 2, this high pressure is conveyed through conduits 12 and 17 to the high tonnage control valve 18, while the still closed valve 121 prevents this pressure from being conveyed to the low tonnage control valve 19. The high tonnage control valve 18, therefore, opens its switch blade 18a. Opening of the switch blade 18a breaks the energizing circuit for the contactor solenoid A, so that the switches $a_1$, $a_2$ and $a_4$ again open, while the switch $a_3$ closes. Opening of the switch $a_1$ has no additional effect at this time. Opening of the switch $a_2$ does not affect the energization of the contactor solenoid B, since the solenoid B remains energized through the holding circuit comprising main supply line 66, switches 68 and 69, line 70, line 74, now closed switch $b_2$, line 109, closed switch $d_2$, line 108, contactor solenoid B and main supply line 67.

Opening of the switch $a_4$ breaks the energizing circuit for the contactor solenoid E, so that the switch $e$ opens and the pump solenoid 25 is deenergized. As a result thereof, a spring (not shown) in the servomotor 20 actuates the link system 21 so as to move the lever 22 in anticlockwise direction, thereby shifting the pump 13 into full delivery retraction stroke position. Consequently, pressure from the pump 13 now flows through the conduit 14 into the lower portion of the main cylinder 2, while fluid is withdrawn through conduit 12 from the upper portion of the main cylinder 2. The ram 5, therefore, moves slightly upwardly. At the same time, at which the switch $a_4$ opens, the switch $a_3$ closes.

Closure of the switch $a_3$ establishes an energizing circuit for the contactor solenoid C, which energizing circuit comprises main supply line 66, switches 68 and 69, line 70, line 75, closed switches 83 and $b_3$, line 110, contactor solenoid C and main supply line 67. Energization of the contactor solenoid C causes closure of the switches $c_1$ and $c_2$. Closure of the switch $c_1$ has no additional effect at this time. Closure of the switch $c_2$ establishes an energizing circuit for the contactor solenoid D, which circuit comprises main supply line 66, switches 68 and 69, line 70, line 77, switch $c_2$, line 112, contactor solenoid D and main supply line 67.

Energization of the contactor solenoid D causes the switch $d_2$ to open and the switches $d_1$ and $d_3$ to close. Opening of the switch $d_2$ breaks the energizing circuit for the contactor solenoid B so that the switches $b_1$, $b_2$, $b_3$ and $b_4$ again open. Opening of the switches $b_1$ and $b_2$ has no additional effect at this time. Opening of the switch $b_3$ has no effect on the solenoid C, since the latter is held energized by its holding circuit, which circuit comprises main supply line 66, switches 68 and 69, line 70, lines 76, 101 and 110, contactor solenoid C and main supply line 67. Opening of the switch $b_4$ deenergizes the contactor solenoid F and, thereby, causes the switch $f$ to open so that the valve solenoids 41 and 41a become deenergized. As a result thereof, the springs 37 and 37a cause the valves 46a and 46 to open and the excessive pressure in the clamping cylinders 29 and 30 is released through their respective pressure relief valves 39 and 39a into the tank 8. While this occurs, the blanking means 58 has cut through the work piece 50.

As was previously mentioned, the contactor solenoid D was energized and, therefore, in addition to opening the switch $d_2$, closes the switches $d_1$ and $d_3$. However, due to the dash-pot arrangement associated with the switches $d_1$ and $d_3$, the actual closure of the said switches is somewhat delayed, so that they will close shortly after the blanking means 58 has actually cut through the work piece 50. Moreover, the dash-pot arrangement of switch $d_3$ is preferably so adjusted that it closes slightly after the switch $d_1$ has closed. Closure of the switch $d_1$ establishes an energizing circuit for the contactor solenoid A, which energizing circuit comprises main supply line 66, switches 68 and 69, lines 70 and 72, switch $d_1$, line 87, contactor solenoid A and main supply line 67.

Energization of the contactor solenoid A again closes the switches $a_1$, $a_2$, and $a_4$, while opening the switch $a_3$. Closure of the switch $a_1$ has no effect at this time. Closure of the switch $a_2$ likewise has no effect, since the switch $d_2$ is open at this time. Opening of the switch $a_3$ likewise has no effect at this time, and closure of the switch $a_4$ energizes the contactor solenoid E, so that the switch $e$ again closes and establishes the energizing circuit for the pump solenoid 25. Energization of the pump solenoid 25 again puts the pump 13 on full stroke forward position, in the manner previously described, so that the ram 5 again moves downwardly.

Closure of the switch $d_3$ energizes the valve solenoid 123, so that the valve 121 establishes fluid connection between the conduits 120 and 122. The ram 5 now continues its downward movement, while the blankholder 49, by engagement with the work piece 50, is halted. The relative movement of the ram 5 to the blankholder 49 creates the desired clamping pressure in the cylinders 29 and 30 and any excessive pressure is released through the now open valves 46 and 46a. This pressing action is illustrated in Figure 6.

When, at the end of the pressing operation, a predetermined pressure is established in the upper portion of the press cylinder 2, this pressure is conveyed through conduits 17, 120 and 122 to the low tonnage control valve 19 so as to cause the latter to open its switch blade 19a. It will be noted that this pressure is not sufficient to open the high tonnage control valve 18. Opening of the switch blade 19a breaks the energizing circuit for the contactor solenoid C so that the switches $c_1$ and $c_2$ open. Opening of the switch $c_1$ has no additional effect. Opening of the switch $c_2$ breaks the energizing circuit for the contactor solenoid D so that the latter causes its switches $d_1$ and $d_3$ to again open, while the switch $d_2$ closes again. Opening of the switch $d_1$ breaks the energizing circuit for the solenoid A so that the switches $a_1$, $a_2$ and $a_4$ open and the switch $a_3$ closes. Opening of the switch $a_1$ has no additional effect. Opening of the switch $a_2$ has likewise no effect since, due to the delayed closing action of the switch $d_2$, the latter will not close before the switch $a_2$ opens. Closure of the switch $a_3$ has no effect, since at this time, the switch $b_3$ is open.

Opening of the switch $a_4$ causes deenergization of the contactor solenoid E so that the switch $e$ opens and breaks the energizing circuit for the pump solenoid 25. As a result thereof, the spring in the servomotor 20 again shifts the pump 13 into full delivery retraction stroke position, in the manner previously explained, thereby initiating the retraction stroke of the ram 5.

Shortly before the contactor solenoid A is deenergized, the switch $d_3$ opens, thereby deenergizing the valve solenoid 123 so that the spring in the valve 121 again closes the said valve. The ram 5 continues its retraction stroke and when the platen 6 has moved upwardly to such an extent that the collars 65 abut the blankholder 49, the latter is picked up and moved upwardly together with the ram 5. When the blankholder 49 has reached a predetermined point during its retraction stroke so that the blanking means 58 has cleared the outer member 54, the strippers 55 eject the portions of the work piece which were previously cut off during the blanking operation, into a waste collector, not shown in the drawings.

When the ram 5 approaches the end of its retraction stroke, the arm 28, by means of the rod 27, actuates the three arm lever 22 so that the latter, by means of the link system 21, shifts the pump 13 to substantially neutral or no delivery position. The press then comes to a halt, while all parts occupy the position shown in Figures 1 and 2. The press is then ready for a new cycle.

If full automatic operation is desired, i. e., an automatic restart of the press when the ram has reached the end of its retraction stroke, the selector switch 84 (Figure 2) is closed so that when, at the end of the retraction stroke, the arm 28 closes the switch 85, the contactor solenoid A is again energized and initiates a new cycle, in the manner previously described.

While the operation of the press has been described so that, at the completion of the advancing stroke, the retraction stroke is initiated by actuation of the low tonnage control valve 19, it is, of course, understood that the retraction stroke could also be initiated by means of the position limit switch 119 which is in series with the switch blade 19a, controlled by the low tonnage control valve 19. The limit switch 119 is arranged so that it can be moved out of the path of the arm 124 connected to the blankholder platen 6 when operation of the low tonnage control valve 19 is desired.

It is also to be understood that the temporary retraction stroke of the ram 5 at the end of the blanking operation may be effected by means of the position switch 86 instead of the high tonnage control valve 18. In this instance, the limit switch 86 will be actuated by an arm or cam connected to the platen 6 shortly after or at a predetermined point during the blanking operation.

Referring now to Figures 9 and 10, illustrating the modification of the invention, the latter primarily differs from that of Figure 1 in that a common solenoid controls the valve controlling the fluid connection between the clamping cylinders and a pressure relief valve, and the valve controlling fluid connection between the advancing side of the ram and the low tonnage control valve. More specifically, the press cylinder 125 communicates through a conduit 126 with a two-way valve 127 adapted to effect fluid connection between the conduit 126 and the conduit 128 leading to a tonnage control valve 129 which, at the completion of the advancing stroke of the press ram 130, initiates the retraction stroke of said ram. The tonnage control valve 129 communicates with a conduit 131 which, in the usual manner, is connected with a fluid storage tank, not shown in Figure 9.

The ram 130 is connected with a main platen 132, which corresponds to the platen 6 in Figure 1, and has clamping cylinders 133 therein. Reciprocably mounted in the clamping cylinders 133 are clamping plungers 134 connected to the blankholder 135, which corresponds to the blankholder 49 of Figure 1 and is adapted to receive and support blanking means similar to the blanking means 58 of Figure 1. The clamping cylinders 133 communicate through conduits 136 and 137 with a two-way valve 138 adapted to effect fluid connection between the clamping cylinders 133 and the conduit 139 leading to a pressure relief valve 140 which, in its turn, communicates through a conduit 141 with the tank, similar to that shown in Figure 1.

The valve members 142 and 143 pertaining to the valves 127 and 138 respectively, are pivotally connected through links 144 and 145 with an armature 146, which is controlled by a solenoid 147. Connected to one end of the armature 146 is a spring 148, having its other end attached to a stationary point 155. The spring 148 continuously urges the armature 146 toward the left so that the valve members 142 and 143 are pulled toward the armature 146 for preventing fluid connection between the conduits 126 and 128 and between the conduits 136 and 139.

The control circuit for the modification of Figure 9 is shown in Figure 10 and will be best understood when discussing a complete cycle of the press of Figure 9. To initiate a cycle of the press, the operator closes the starter switch 149 so that current flows from the main supply line 150 through the starter switch 149 and contactor solenoid 151 to the main supply line 152. Energization of the contactor solenoid 151 causes its switch blades 153 and 154 to move into closing position. Closure of the switch blade 153 establishes a holding circuit for the solenoid 151, which holding circuit comprises main supply line 150, switch blade 129a, emergency switch 156, blade 153 and main supply line 152. The switch blade 129a forms a part of the tonnage control valve 129 and is opened thereby in response to a predetermined pressure acting on the tonnage control valve 129. Closure of the switch blade 154 establishes an energizing circuit for the pump solenoid 25a, which latter corresponds to the pump solenoid 25 in Figure 1. As a result of the energization of the pump solenoid 25a, fluid from the pump, which may be pump 13, is conveyed through conduit 157 to the upper portion of the press cylinder 125, while fluid is withdrawn from the lower portion of the press cylinder 125 through the conduit 158. The ram 130, main platen 132 and blankholder 135 then move downwardly in a manner similar to that described in connection with Figure 1. It is, of course, understood that check valves, similar to the check valves 43 and 44 in Figure 1, are associated with the structure of Figure 9 to allow the filling of the clamping cylinders 133. Inasmuch as fluid connection between the conduits 136 and 137 and the conduit 139 is prevented, at this time through the closed valve 138, the press performs its blanking operation in the manner described in connection with Figure 1.

Shortly after the blanking operation has been completed, the main platen 132, or an arm connected thereto, closes the limit switch 159, thereby establishing an energizing circuit for the control solenoid 160, which energizing circuit comprises main supply line 150, switch 159, solenoid 160 and main supply line 152. Energization of the solenoid 160 causes switch blade 161 to close and thereby to establish a holding circuit for the solenoid 160. Energization of the solenoid 160 furthermore closes switch blade 162, which latter establishes an energizing circuit for the control solenoid 147.

Energization of the control solenoid 147 moves the armature 146 against the thrust of the spring 148 toward the right with regard to Figure 9, thereby causing the valve members 142 and 143 to open their respective valves 127 and 138. At this time the pressure in the upper portion of the press cylinder 125 has already been reduced to such an extent that it will not operate the tonnage control valve 129, while the excessive pressure in the clamping cylinders 133 is released through the pressure relief valve 140. The press now begins its actual drawing operation in the usual manner.

When, at the end of the drawing operation, a predetermined pressure has been built up in the upper portion of the press cylinder 125, this pressure is conveyed through conduit 126 to the tonnage control valve 129 which then, similar to the tonnage control valve 19 of Figure 1, causes its switch blade 129a to open, thereby breaking the energizing circuit for the pump solenoid 25a. The ram 130 then starts its retraction stroke and, when it approaches the end of its retraction stroke, opens the normally closed limit switch 163, thereby breaking the energizing circuit for the contactor solenoid 147 and allowing the spring 148 to close the valves 127 and 138. Furthermore, when approaching the end of its retraction stroke, the platen 132, similar to the platen 6 of Figure 1, shifts the pump, which supplies fluid to the cylinder 125, to neutral or no delivery position, so that the press comes to a halt and is then ready for a new cycle.

Referring now to Figures 11 and 12 illustrating a further embodiment of the invention, the same comprise a press cylinder 164 having reciprocably mounted therein a ram 165 which is connected to the main platen 166. The main platen 166 has clamping cylinders 167 in which are reciprocably mounted clamping plungers 168 connected to a blank-holder 169. Similar to the arrangement of Figure 1, the blankholder 169 has a bore 170, through which the press plunger 171 may pass, and supports blanking means 203, similar to the balnking means 58 of Figure 1.

The hydraulic circuit for the press of Figure 11 substantially corresponds to that of Figure 1 and will, therefore, be referred to only when describing the operation of the press of Figure 11.

However, in contrast to the press of Figure 1, the press of Figure 11 has its press cylinder 164 connected, by means of a conduit 172, with a control cylinder 173 having reciprocably mounted therein a plunger 174. The plunger 174 is engaged by one end of a strong spring 175, the other end of which engages the upper end of the cylinder 173. The plunger 174 has, furthermore, connected therewith a control rod 176, carrying a bell crank lever 177, which is pivoted to the rod 176 by means of a pivot 178.

The rod 176 is provided with an arm 179 to which is attached one end of a spring 180, the other end of which is connected to a pivot 181 carried by the arm 182 of the lever 177. The arm 182 is adapted to cooperate with a limit switch 183 so as to close the latter when the arm 182 engages the limit switch 183 during the downward movement of the rod 176, while the arm 182 slides around the switch 183 when the rod 176 moves upwardly.

The control circuit of the structure of Figure 11 is shown in Figure 12, and will be clearly understood by a brief description of the operation of Figure 11.

When it is intended to cause the press of Figure 11 to perform a working cycle, the operator closes the starter switch 184, thereby closing an energizing circuit for the contactor solenoid 185, which energizing circuit comprises main supply line 186, starter switch 184, line 187, contactor solenoid 185, line 188, tonnage control valve 189 and main supply line 190. Energization of the contactor solenoid 185 causes closure of the contactor blade 191 so that the latter establishes a holding circuit for the solenoid 185, which holding circuit comprises main supply line 186, line 192, contactor blade 191, line 193, line 187, contactor solenoid 185, tonnage control valve 189 and main supply line 190.

Energization of the contactor solenoid 185 also closes the contactor blade 194, which latter establishes an energizing circuit for the pump solenoid 195. Energization of the pump solenoid 195 actuates the armature 196 (Figure 11) so as to cause the latter to shift the three arm lever 197 which, in its turn by means of the linkage 198, moves the pump 13a into full delivery forward stroke position. Pressure fluid from the pump 13a is therefore delivered through conduit 199 into the upper portion of the press cylinder 164 and withdrawn from the lower portion of the press cylinder 164 through conduit 200.

Similar to the embodiment of Figure 1, the press ram 165, main platen 166 and blankholder 169 move downwardly. During this downward movement of the ram, platen and blankholder, the two-way valves 201 and 202 are closed by a spring not shown in the drawings. When the shearing means 203 engages the work piece, pressure builds up in the upper portion of the press cylinder 164 so that the surge valve 204 closes, and pressure also builds up in the clamping cylinders 167 since, as previously mentioned, the valves 201 and 202 are closed.

In a manner similar to that described in connection with Figure 1, the blankholder 169 now performs the blanking or shearing operation. The pressure acting upon the ram 165 during the blanking operation is conveyed through conduit 172 beneath the piston 174 and lifts the latter against the thrust of the spring 175. As a result thereof, the piston rod 176 moves upwardly, while the lever arm 182 slides around the switch 183.

When the blankholder 169 is about to complete, or has completed, the blanking operation, the pressure acting upon the ram 165 has fallen off to such an extent that the strong spring 175 moves the piston 174 downwardly.

Since the pin 205 on the rod 176 prevents the movement of the lever 177 in clockwise direction beyond a predetermined point, the downward movement of the rod 176, connected to the piston 174, causes the lever arm 182 to temporarily close the switch 183. Closure of the switch 183 (see Figure 12) establishes an energizing circuit for the contactor solenoid 206, which energizing circuit comprises main supply line 186, switch 183, line 207, solenoid 206, lines 208 and 188, switch blade 189a of tonnage control valve 189, and main supply line 190. As a result, the contactor blade 209 establishes a holding circuit for the solenoid 206, which holding circuit comprises main supply line 186, line 210, contactor blade 209, line 207, solenoid 206, lines 208 and 188, switch blade 189a and main supply line 190.

Furthermore, the contactor solenoid 206 closes the contactor blade 211, thereby closing the energizing circuit for the valve solenoids 212 and 213 respectively moving the valves 201 and 202 into open position so that the conduits 214 and 215 connect the clamping cylinders 167 with their respective pressure relief valves 216 and 217. As a result of the energization of the contactor solenoid 206, also the contactor blade 218 closes and establishes an energizing circuit for the solenoid 219, which actuates the normally closed two-way valve 220 so as to establish fluid connection between the conduit 221, branching off from the conduit 199, and the conduit 222 leading to the tonnage control valve 189. From now on the pressure prevailing in the upper portion of the press cylinder 164 is conveyed to the tonnage control valve 189. The press now performs its actual drawing operation, during which a predetermined pressure, controlled by the pressure relief valves 216 and 217, is maintained in the clamping cylinders 167.

When, at the end of the drawing operation, a predetermined pressure has built up in the upper portion of the press cylinder, this pressure, which is conveyed through conduits 199, 221 and 222 to the tonnage control valve 189, actuates the latter so as to open the switch blade 189a, thereby breaking the holding circuit for the contactor solenoid 185. As a result thereof, the energizing circuit for the pump solenoid 195 is broken, so that the spring in the servomotor 29a, pertaining to the pump 13a, shifts the pump 13a into full delivery retraction stroke position. The press ram 165 now starts its retraction stroke in a manner similar to that described in connection with Figure 1.

When, at the end of the retraction stroke, the platen arm 223 engages the lever 197, the latter is shifted so as to cause the pump 13a to move to substantially neutral or no delivery position. The press then comes to a halt and is ready for a new cycle.

Referring now to Figure 13, the general setup shown therein is similar to that of Figure 1, but differs therefrom primarily by a slow down arrangement controlling the movement of the ram 224 reciprocable in the press cylinder 225.

Communicating with the upper portion of the press cylinder 225 is a conduit 226 leading to one side of the variable delivery pump 13b, the other side of which communicates through the conduit 227 with the lower portion of the press cylinder 225. Branching off from the conduit 226 is a conduit 228 leading to a two-way valve 229 adapted, in its open position, to establish fluid connection between the conduit 228 and the conduit 230 leading to the tonnage control valve 231. The two-way valve 229 is normally held in closed position by means of the spring 232, but is adapted to be moved into open position by energization of the solenoid 233.

Similar to the arrangement of Figure 11, the clamping cylinders 234 communicate with conduits 235 and 236 respectively leading to two-way valves 237 and 238, which are normally held in closed position by means of springs 239 and 240. The valves 237 and 238 are adapted to be moved into open position by energization of the solenoids 241 and 242 respectively so as to allow excessive pressure in the clamping cylinders 234 to escape through the pressure relief valves 243 and 244 into the conduit 245 leading to the fluid storage tank 246. The blankholder 247 carries blankholding means 248 and is also provided with a cam 249 adapted to close the switch 250.

The main platen 251 is operable, when approaching its starting position, to shift the bell crank lever 252 about its pivot 253 so that it actuates the push rod 254, pivotally connected to the lever 252 in such a manner that the rod 254, by means of the lever, shifts the pump 13b to substantially neutral or no delivery position.

The arm 255 is pivotally connected to a control rod 256 passing through a control mechanism, generally designated 257, and connected to a control piston 258. The control piston 258 is reciprocable in a control cylinder 259 and is adapted to cooperate with a slow down piston 260 reciprocable in a bore 261.

A conduit 262 leads to a slow down valve 263 comprising a cylinder 264 and a plunger 265 reciprocable in the cylinder 264. Provided in the top of the cylinder 264 is a bleeder opening 266. The top of the cylinder 264 is engaged by a spring 267, the lower end of which continuously urges the plunger 265 into its lowermost position, in which the plunger 265 prevents fluid connection between the conduit 262 and a conduit 268, which latter communicates, by means of a conduit 269, with a pressure fluid source 270 which may, for instance, be a container filled with compressed air.

The plunger 265 is adapted to be moved upwardly against the thrust of the spring 267 by energization of the slow down solenoid 271. Communicating with the conduit 268 is a starter valve 272, which comprises a cylinder 273 and a plunger 274 reciprocable in the cylinder 273. The cylinder 273 has, similar to the cylinder 264, a bleeder opening 275 and a spring 276, continuously urging the plunger 274 into its lower position so as to prevent fluid communication between the conduit 268 and the conduit 277 leading to the control cylinder 259. The plunger 274 is adapted to be moved into its upper position against the thrust of the spring 276 by energization of the solenoid 278.

The electric control circuit for the structure of Figure 13 is shown in Figure 14 and will be best understood from a brief description of the operation of the device of Figure 13.

It may be assumed that all parts in Figure 13 occupy the position shown therein and that it is now desired to perform a working cycle of the press. To this end the operator closes the starter switch 279, thereby establishing an energizing circuit for the contactor solenoid 280, which circuit comprises main supply line 281, the switch 279, contactor solenoid 280, line 282 and main supply line 283. Energization of the solenoid 280 causes the contractor blade 284 to establish a holding circuit for the solenoid 280, which holding circuit comprises main supply line 281, line 285, blade 231a pertaining to the tonnage control valve 231, line 286, blade 284, line 282 and main supply line 283. Energization of the solenoid 280 also causes the contactor blade 287 to electrically connect line 288, communicating with the main supply line 281, with the line 289, comprising the starter solenoid 278 and leading to the main supply line 283.

Energization of the starter solenoid 278 moves the plunger 274 upwardly against the thrust of the spring 276 so that pressure fluid from the fluid source 270 passes through conduits 269 and 268, valve 272 and conduit 277 in part directly into the control cylinder 259 and, in part, through the check valve 290 into the control cylinder 259. As a result thereof, the plunger 258 is moved toward the left with regard to Figure 13, expelling the fluid between the piston 258 and the piston 260 through the exhaust opening 291. When the piston 258 engages the piston 260, it comes to a halt and has shifted the pump 13b into full delivery forward stroke position.

Pressure fluid from the pump 13b is now delivered through conduit 226 into the upper portion of the press cylinder 225, while fluid is withdrawn from the lower portion of the press cylinder through conduit 227. The press ram 224, together with the main platen 251 and blankholder 247, moves downwardly by gravity as fast as fluid is withdrawn through conduit 227. During this downward movement, fluid from the tank 246 passes through a surge valve 292 to fill the upper portion of the press cylinder 225.

When the shearing means 248 engages the work piece, pressure begins to build up in the upper portion of the press cylinder 225 and closes the surge valve 292. Furthermore, relative movement of the ram 224 to the blankholder 247 begins so that pressure also begins to build up in the clamping cylinders 234. However, inasmuch as the valves 237 and 238 are closed, the ram 224 and blankholder 247 become hydraulically interlocked so that the pressure acting on the ram 224 is completely conveyed to the blinking means 248, which now start their actual blanking or shearing operation. Since, at this time, the two-way valve 229 is held closed by the spring 232, the increased pressure acting upon the ram 224 cannot operate the tonnage control valve 231.

At about, or shortly after, the completion of the blanking or shearing operation, the cam 249 closes the limit switch 250, thereby energizing the contactor solenoid 293 through main supply line 281, lines 294 and 295 and main supply line 283. Energization of the solenoid 293 causes the contactor blade 296 to connect line 297, communicating with main supply line 281, with the line 298, comprising the slow down solenoid 271 and leading to the main supply line 283.

Energization of the slow down solenoid 271 causes the latter to move the plunger 265 into its upper position against the thrust of the spring 267, thereby allowing pressure fluid from the fluid source 270 to pass through conduits 269, 268 and 262 into the left end of the bore 261, where it acts upon the piston 260 and moves the latter toward the right until it abuts the shoulder 299. It will be appreciated that this rightward movement is brought about by the fact that the diameter of the piston 260 is greater than the diameter of the piston 258, while the presure acting on both pistons is the same.

The rightward movement of the piston 260 also causes rightward movement of the piston 258, and when the piston 260 comes to a stop, the piston 258 has reached a position which corresponds to a restricted forward delivery position of the pump 13b. Consequently, the movement of the ram 224 is slowed down to a desired extent, thereby cushioning the start of the actual drawing operation. The cam 249 has a certain length, to maintain the switch 250 closed for a predetermined time, so that also the solenoid 293 remains energized for the said time.

Energization of the solenoid 293 also causes closure of the contactor blade 300 so that the latter closes the energizing circuit for the contactor solenoid 301, which circuit comprises main supply line 281, line 302, contactor blade 300, line 303, contactor solenoid 301, line 304 and main supply line 283. Energization of the solenoid 301 causes contactor blade 305 to establish a holding circuit for the solenoid 301 by connecting the line 306, communicating with the line 286, with the line 303 which, through solenoid 301 and line 304, communicates with the main supply line 283. Energization of the solenoid 301 also causes the contactor blade 307 to establish an energizing circuit for the valve solenoids 241 and 242, while simultaneously the contactor blade 308 establishes connection of the lines 309 and 310 with the line 311 comprising the valve solenoid 233 and leading to the main supply line 283.

Energization of the valve solenoids 241, 242 and 233 causes opening of the valves 237, 238 and 229. The excessive pressure from the clamping cylinders 234 may now escape through the pressure relief valves 243 and 244, while the pressure in the upper portion of the press cylinder 225, which has in the meantime fallen off, is not sufficient at this time to operate the tonnage control valve 231. The blankholder 247 now acts in the usual manner as blankholder to hold the work piece, while the ram 224 continues its advancing movement and performs the actual drawing operation.

It will be clear from the diagram of Figure 14 that when the cam 249 leaves the switch 250 so that the latter again opens, due to the spring 312 associated therewith, this will not affect the energization of the solenoids 241 and 242 and also solenoid 233, since the contactor solenoid 301 is held energized by its holding circuit. On the other hand, as soon as the switch 250 opens, the contactor solenoid 293 becomes deenergized and, thereby, deenergizes the slow down solenoid 271, so that the spring 267 moves the plunger 265 into its lower position and allows the fluid in the left portion of the bore 261 to escape through conduit 262 and the bleeder opening 266. Inasmuch as the fluid source 270 still communicates with the right end of the bore 259 through the conduit 277, the pressure acting upon the piston 258 shifts the latter again toward the left until the piston 260 is halted by the left end of the bore 261, at which time the pump 13b is again in full delivery forward stroke position, thereby speeding up the movement of the ram 224.

When, at the end of the drawing operation, a predetermined pressure has developed in the upper portion of the press cylinder 225, this pressure is conveyed through the conduits 228 and 230 to the tonnage control valve 231, thereby causing the latter to open its switch blade 231a. Opening of the switch blade 231a breaks the holding circuit for the solenoid 280, thereby causing the switch blades 284 and 287 to return to open position so that the starter solenoid 278 becomes deenergized. The spring 276 of the starter valve 272, therefore, returns the plunger 274 to its lower position, in which the latter interrupts fluid connection between the pressure fluid source 270 and the conduit 277. Consequently, the spring 313 in the servomotor 314 of the pump 13b shifts the pump 13b into full delivery retraction stroke position, while shifting the lever 255 about the pivot 315 so that the piston 258 moves toward the right with regard to Figure 13.

During this downward movement, the fluid expelled from the cylinder 259 escapes through the conduit 277 and the bleeder opening 275. Pressure fluid from the pump 13b is now conveyed through conduit 227 into the lower portion of the cylinder 225, while pressure fluid from the upper portion of the press cylinder 225 escapes in part through conduit 226 to the pump 13b and in part through surge valve 292 into the tank 246. The press ram 224, therefore, moves downwardly.

Opening of the tonnage control switch blade 231a also breaks the holding circuit for the valve solenoids 241, 242 and 233 so that the respective springs 248 and 232 again move the said valves into closing position. When the ram 224 approaches the end of its retraction stroke, the main platen 251 engages the lever 252 so as to cause the latter, by means of the rod 254 and lever 255, to move the pump 13b substantially into neutral or no delivery position. The press then comes to a halt and is ready for a new cycle.

Referring now to Figure 15, the same illustrates the invention in connection with a drawing press having a blankholder which is operable independently of the press ram. More specifically, the structure diagrammatically illustrated in Figure 15 comprises a press head, generally designated 316, having a press cylinder 317 and two clamping cylinders 318 and 319. Reciprocably mounted in the press cylinder 317 is a press ram 320 connected to the press platen 321 which carries the press plunger 322. The press plunger 322 is adapted, in cooperation with the die 323, to shape the work piece 324.

Communicating with the upper portion of the press cylinder 317 is a conduit 325 leading to a four-way valve 326 of standard design, adapted to effect communication between the conduit 325 and the conduit 327 leading to the pressure side of the pump 328. The suction side of pump 328 communicates through conduit 329 with the fluid storage tank 330. When the valve 326 connects the conduits 325 and 327 with each other it simultaneously establishes fluid connection between the conduit 331, communicating with the lower portion of the press cylinder 317, and the conduit 332 leading to the tank 330. When the valve 326 is shifted into its other position, it connects the conduit 325 with the conduit 332, while effecting fluid connection between the conduits 327 and 331. The valve member of the valve 326 is connected with a valve rod 333 adapted to be actuated by an arm 334 connected to the platen 321.

When the ram 320 approaches its starting position, the arm 334 shifts the rod 333 so that the latter moves the valve 326 into its neutral or by-passing position, in which the delivery of the pump 328 is by-passed through conduit 332 into the tank 330.

Reciprocably mounted in the clamping cylinders 318 and 319 are clamping plungers 335 and 336 respectively, which have connected thereto a blankholder 337. The blankholder 337 carries blanking or shearing means 338 in a manner similar to the structure of Figure 1. The shearing means 338 is adapted, in cooperation with the edges 339 and 340, to blank the work piece 324. The upper portion of the clamping cylinders 318 and 319 communicates with a conduit 341 leading to a four-way valve 342 of the same type as the four-way valve 326. Similar to the latter, the valve 342 is adapted to establish fluid connection between the conduit 341 and the conduit 343 leading to the pressure side of a pump 344, the suction side of which is connected through conduit 345 with the tank 330. When the valve 342 establishes fluid connection between the conduits 341 and 343, the conduit 346 connects the conduit 347 with the exhaust conduit 348. The valve 342 is adapted to be shifted into by-passing position by means of a push rod 349 and the blankholder arm 350, so that the delivery of the pump 344 is by-passed into the tank 330.

The pump 344 is a variable delivery pump having a servomotor 351 which, in response to a predetermined pressure thereof, moves the pump 344 to substantially neutral or no delivery position. The servomotor 351 communicates through a conduit 352 with a three-way valve 353 normally urged by a spring 374 into position for connecting the conduit 352 with the conduit 354. The conduit 354 leads to the conduit 345. When the conduit 352 communicates with the conduit 354, fluid connection is prevented between the conduit 352 and the conduit 355 communicating with the conduit 356. The conduit 356 has one end connected to the conduit 343, while the other end leads to a pressure responsive switch 357 adapted, in response to a predetermined pressure, to establish electric connection between the line 358, communicating with the main supply line 359, and the line 360 connected to one end of a contactor solenoid 361. The other end of the contactor solenoid 361 communicates through line 362 with the main supply line 363.

The solenoid 361 controls contactor blades 364 and 365, of which the contactor blade 364, when closed, connects the line 360 with the line 366 which, in its turn, is adapted to be connected with line 367 by closure of the blade 368. The blade 368 is connected to a control rod 369 which is slidable relative to the blankholder arm 350, but adapted to be lifted by the latter by engagement of the arm 350 with the collar 370. Closure of the contactor blade 365 is adapted to connect line 371, communicating with main supply line 359, with the line 372, comprising the valve solenoid 373 and leading to the main supply line 363. The solenoid 373, when energized, establishes fluid connection between the conduits 352 and 355, while preventing fluid connection between the conduits 352 and 354.

To operate the structure of Figure 15, the operator first starts the pump 344 and shifts the valve 342 so that pressure fluid from the pump 344 is delivered through conduit 343 and valve 342 into the conduit 341 communicating with the upper portion of the press cylinders 318 and 319, while fluid connection is established between the conduits 347 and 346 with the exhaust line 348. As a result, the clamping plungers 335 and 336 with the blankholder 337 move downwardly. When the blankholder 337, during this downward movement, has travelled by a predetermined distance, the blade 368 connects the lines 367 and 366 with each other. While the blade 368 remains in this closing position, the blankholder 337 continues to move downwardly and eventually causes its blanking means 338 to blank the work piece 324. At about the end of this blanking operation, the pressure in the pressure line 343 and the conduit 356 has increased to such an extent that it causes the switch 357 to move its blade 357a into position for interconnecting the lines 358 and 360. This establishes an energizing circuit for the contactor solenoid 361 so that the latter moves its blades 364 and 365 into closing position. Inasmuch as the blade 368 is already in closing position, closure of the blade 364 establishes a holding circuit for the solenoid 361.

Closure of the blade 365 establishes an energizing circuit for the valve solenoid 373 which energizing circuit comprises main supply line 359, line 371, blade 365, line 372, solenoid 373 and main supply line 363. Energization of the solenoid 373 moves the valve 353 into position for connecting the conduits 355 and 352. By this time, the blanking operation is completed.

Due to the connection of the conduit 355 with the conduit 353, the pressure prevailing in the upper portion of the clamping cylinders 318 and 319 is conveyed to the servomotor 351 and, while the blankholder holds the work piece 324 in clamped position, a predetermined pressure on the blankholder plungers causes the pump 344 to move to substantially neutral or no delivery position. In this way, a predetermined clamping pressure is maintained on the clamping plungers 335 and 336 and, thereby, the blankholder 337.

The operator then actuates the valve 326 so as to establish fluid connection between the conduits 325 and 327, while connecting the conduit 331 with the conduit 332. Pressure fluid delivered by the pump 328 is now passed to the upper portion of the press cylinder 317, while fluid may escape from the lower portion of the cylinder 317 through conduit 331 and conduit 332 into the tank 330. The ram 320 and, therefore, the platen 321 and press plunger 322 move downwardly and now perform the actual drawing operation.

At the end of the drawing operation, the operator reverses the valve 326 so that pressure fluid from the pump 328 is passed through conduits 327 and 331 into the lower portion of the press cylinder 317, while fluid may escape from the upper portion of the press cylinder 317 through conduits 325 and 332 into the tank 330.

When the ram 320 approaches the end of its retraction stroke, the platen arm 334 actuates the rod 333 so that the latter shifts the valve 326 into neutral or by-passing position, in which the delivery of the pump 328 is by-passed into the tank 330. As a result thereof, the ram 320 comes to a halt. The operator thereupon reverses the valve 342 so that the conduit 343 communicates with the conduit 346. This causes a pressure drop and, as a result, the pump 344 is again put on stroke. Due to the said pressure drop, also the switch 357 retracts its blade 357a, thereby breaking the holding circuit for the solenoid 373 and causing the spring 374 to move the valve 353 into position in which the conduit 352 communicates with the conduit 354, while fluid connection is interrupted between the conduits 352 and 355. Pressure fluid from the pump 344 is now delivered through conduits 343, 346 and 347 into the lower portion of the clamping cylinders 318 and 319 so that the latter move upwardly and expel the fluid from the upper portion of the clamping cylinders through conduits 341 and 348 into the tank 330.

When the blankholder 337 approaches the end of its retraction stroke, the blankholder arm 350 actuates the rod 349 so as to cause the latter to shift the valve 342 into its by-passing position in which the delivery of the pump 344 is by-passed into the tank 330. The blankholder 337 comes to a halt and the press is ready for a new cycle.

Referring now to the arrangement of Figure 16, the same is very similar to that of Figure 15, and similar parts are, therefore, designated with the same reference numerals as in Figure 15, however, with the additional letter a.

The structure of Figure 16 differs from that of Figure 15 substantially only in that the pump 344 with the servomotor 351 has been replaced by a pump 375, having its pressure side connected to the four-way valve 342a, while the suction side is connected through the exhaust conduit 376 comprising a variable pressure relief valve 377, and having one end connected to the tank 330a, while the other end is connected to a two-way valve 378. The two-way valve 378 is continuously urged into closing position by means of a spring 379, but is adapted to move into open position by means of the valve solenoid 373a, in which position the conduit 376 communicates with the conduit 355a.

The operation of the structure of Figure 16 corresponds to that of Figure 15, and need not be described further. The only difference consists in that when the valve solenoid 373a is energized, the delivery of the pump 375 will, at a predetermined pressure in the conduit 343a, be passed through the relief valve 377 into the tank 330a.

While the valves 326, 342 and 326a, 342a have been described as hand operated, it is, of course, understood that these valves may be automatically operated in any standard manner, well known to those skilled in the art, without in any way affecting the present invention.

It will be understood that we desire to comprehend within our invention such modifications as come within the scope of the claims and the invention.

Having thus fully described our invention, what we claim as new and desire to secure by Letters Patent is:

1. In a press system, a drawing plunger for drawing a work piece, fluid operable blankholder means operable to advance toward a work piece and to hold the same while it is being drawn by said drawing plunger, shearing or blanking means connected to said blankholder means for shearing or blanking a work piece, means operable to actuate said blankholder means so as to cause the same to effect a blanking operation prior to said drawing operation, controlling means for preventing the fluid pressure acting upon said blankholder means from dropping beneath a predetermined value during the initial phase of said shearing or blanking operation, and means responsive to a predetermined pressure acting on said blankholder means during said blanking operation for initiating a reduction of said predetermined pressure prior to the initiation of the actual drawing operation.

2. In a press system, a drawing plunger for drawing a work piece, fluid operable blankholder means operable to advance toward a work piece and to hold the same while it is being drawn by said drawing plunger, shearing or blanking means movably connected with said blankholder means for shearing or blanking a work piece, means operable to actuate said blankholder means for causing said blanking means to effect a blanking operation prior to said drawing operation, controlling means for preventing the fluid pressure acting upon said blankholder means from dropping below a predetermined value during the initial phase of said blanking operation, and means responsive to a predetermined travel of said blankholder means for initiating a reduction in the pressure on said blankholder means below said predetermined value prior to the initiation of the actual drawing operation by said drawing plunger.

3. In a press system, a reciprocable press plunger for shaping a work piece, reciprocable blankholder means, fluid operable motor means comprising a clamping cylinder and a clamping piston for exerting pressure on said blankholder means, pressure relief means operable automatically to relieve pressure from said clamping cylinder in excess of a predetermined pressure, valve means interposed between said clamping cylinder and said pressure relief means for selectively making said pressure relief means ineffective, blanking or shearing means operable by said blankholder means for performing a blanking or shearing operation, means for conveying fluid pressure to said clamping cylinder to cause said blankholder means to bring about a shearing or blanking operation, means operable to actuate said valve means for making said relief means ineffective during the actual blanking or shearing operation, means actuating said valve means to establish fluid connection between said relief means and said clamping cylinder prior to the actual shaping operation by said press plunger, and means for causing said blankholder means to hold said work piece clamped during said shaping operation.

4. In a press system, a press plunger operable to shape a work piece, shearing or blanking means for cutting a work piece to size, reciprocable blankholder means operable selectively to actuate said blanking means or to hold a work piece clamped against a support during the actual shaping operation by said press plunger, fluid operable motor means including a cylinder and a piston for exerting pressure on said blankholder means, relief means operable to relieve pressure from said cylinder in excess of a predetermined pressure, conduit means for connecting said cylinder with said relief means, valve means movable selectively into a first position for interrupting fluid communication between said cylinder and said relief means and into a second position for establishing said fluid communication, and means controlling said valve means to hold the latter in said first position during the actual blanking operation and to hold said valve in said second position during the actual shaping operation by said plunger.

5. In a press system, a press plunger operable to shape a work piece, shearing or blanking means for cutting a work piece to size, reciprocable blankholder means operable selectively to actuate said blanking means or to hold a work piece clamped again a support during the actual shaping operation by said press plunger, fluid operable motor means including a cylinder and a piston for exerting pressure on said blankholder means, a fluid source for supplying pressure fluid to said motor means for actuating the same, relief means operable to relieve pressure from said cylinder in excess of a predetermined pressure, conduit means for connecting said cylinder with said relief means, valve means movable selectively into a first position for interrupting fluid communication between said cylinder and said relief means and into a second position for establishing said fluid communication, means normally holding said valve means in said first position, electric means operable automatically at about the completion of the blanking operation by said shearing means to cause said valve means to move into said second position, to thereby prevent said blankholder means during the shaping operation of said press plunger from exerting a pressure upon said work piece in excess of said predetermined pressure, and means operable after the completion of said blanking operation for actuating said press plunger to shape said work piece.

6. In a press system, a press plunger for shaping a work piece, motor means for reciprocating said press plunger, blankholder means adapted to receive shearing means and to actuate the same for blanking or cutting a work piece to size, said blankholder means also being adapted to clamp a work piece against a support while it is being shaped by said press plunger, means responsive to a movement of said press plunger relative to said blankholder means for creating pressure and exerting the same upon said blankholder means while the latter clamps said work piece against said support, and means operable to hydraulically interlock said blankholder means and said press plunger to convey pressure acting upon the latter to said blankholder means for causing the same to perform a blanking operation.

7. In a press system, a press plunger for shaping a work piece, motor means for selectively advancing and retracting said press plunger, blankholder means operable to hold a work piece clamped against a support while it is being shaped by said press plunger, means associated with said blankholder means for actuating shearing or blanking means to blank or cut a work piece to size while said press plunger is advancing toward said work piece, means for hydraulically interlocking said press plunger and said blankholder means during a predetermined portion of the advancing stroke of said plunger to cause said blankholder means to actuate said blanking means for performing a blanking operation, and means operable subsequently to the actual blanking operation to continue the advancing movement of said press plunger while said blankholder means is halted to thereby exert clamping pressure on said blankholder means for causing the latter to clamp the sized work piece against said support while said work piece is being shaped by said press plunger.

8. In a press system, a press plunger for shaping a work piece, motor means for selectively advancing or retracting said press plunger, blankholder means operable selectively to actuate shearing or blanking means for cutting a work piece to size, or to clamp a work piece against a support while it is being shaped by said press plunger, controlling means operable automatically to positively interlock said press plunger and said blankholder means to exert a relatively high pressure on said blankholder means for actuation of said shearing means and subsequently to allow movement of said press plunger relative to said blankholder means while said press plunger is moving toward said work piece, and means responsive to said relative movement for creating a pressure on said blankholder means lower than said relatively high pressure to cause said blankholder means to hold said work piece clamped while it is being shaped by said press plunger.

9. In a press system, a press plunger for shaping a work piece, motor means for selectively advancing or retracting said press plunger, blanking means for cutting a work piece to size, blankholder means operable selectively to actuate said blanking means or to clamp a work piece against a support while it is being shaped by said press plunger, means for conveying a relatively high pressure from said motor means to said blankholder means to cause the latter to actuate said blanking means, means responsive to a predetermined pressure on said press plunger during said blanking operation for temporarily reversing the movement of said motor means, electric means responsive to said reversal for again reversing said motor means to advance said press plunger toward said work piece, and means responsive to said last mentioned reversal to exert a reduced pressure on said blankholder means to cause the latter to clamp the blank or work piece against a support while said work piece is being shaped by said press plunger.

10. In a press system, a press plunger for shaping a work piece, blankholder means adapted to receive and actuate blanking or shearing means for cutting a work piece to size, said blankholder means also being operable to clamp a work piece against a support while it is being shaped by said press plunger, fluid operable means associated with said blankholder means for selectively advancing the latter toward a work piece, a fluid pressure source for supplying pressure fluid to said fluid operable means for actuating the same, controlling means associated with said fluid source and operable, in response to a predetermined pressure on said fluid operable means during the shaping operation of said press plunger, for reducing the delivery of said fluid source to said fluid operable means, to thereby prevent said blankholder means from exerting a pressure on said work piece in excess of said predetermined pressure, valve means movable selectively into a first position for preventing fluid connection between said fluid operable means and said controlling means, or movable into a second position for establishing the said fluid connection, means associated with said valve means for automatically maintaining said valve means in said first position during the blanking operation of said blanking means prior to the establishment of a predetermined blanking pressure on said blankholder means, means responsive to the establishment of said predetermined blanking pressure on said blankholder means for moving said valve means into said second position, and motor means operable to reciprocate said press plunger.

11. In a press system, a press plunger for shaping a work piece, blanking or shearing means for blanking or cutting a work piece to size, blankholder means operable selectively to operate said blanking means, or to clamp a work piece against a support while it is being shaped by said press plunger, fluid operable means including a cylinder and a piston for advancing said blankholder means and said blanking means toward a work piece, conduit means adapted to connect said cylinder with relief means operable to relieve pressure from said cylinder in excess of a predetermined pressure during the shaping operation of said press plunger, valve means interposed between said cylinder and said relief means and movable selectively into a first position for interrupting fluid connection between said cylinder and said relief means, or into a second position for establishing said fluid connection, means for holding said valve means in said first position prior to the establishment of a predetermined blanking pressure on said blanking means, means operable in response to the establishment of said predetermined blanking pressure to shift said valve means into said second position, to thereby prevent said blankholder means during the shaping action of said press plunger from exerting a clamping pressure on said work piece in excess of a predetermined value, and motor means operable to reciprocate said press plunger.

12. In a press system, a reciprocable press plunger for shaping a work piece, motor means for advancing said press plunger, blanking or shearing means for blanking a work piece, blankholder means operable by said motor means to sequentially actuate said blanking means, and to hold a work piece clamped against a support while it is being shaped by said plunger, means responsive to the movement of said press plunger by a predetermined distance during said blanking operation for slowing down the speed of said motor means, and means to cushion the actual shaping operation of said press plunger responsive to the movement of said plunger toward said work piece by a distance greater than said predetermined distance for again increasing the speed of said motor means, to thereby cause said press plunger to perform a shaping operation at increased speed while said blankholder means holds said work piece clamped against said support.

13. In a press system, a press plunger operable to shape a work piece, motor means for selectively advancing and retracting said plunger, blanking means operable to hold a portion of said work piece clamped against a support while said work piece is being shaped by said press plunger, blanking means connected to said blankholder for blanking or sizing a work piece, means operable automatically in response to the travel of said press plunger to actuate said blankholder means so as first to exert blanking pressure upon said blanking means and subsequently to exert clamping pressure lower than said blanking pressure upon the thus sized blank or work piece, and means automatically reducing the advancing movement of said press plunger near the end of said blanking operation and subsequently to again speed up the advancing movement of said press plunger.

14. In a press system, a ram having associated therewith fluid operable advancing and retracting means, a clamping cylinder connected to said ram, blankholder means having associated therewith a plunger reciprocable in said cylinder for actuating said blankholder means, said blankholder means being operable selectively to actuate shearing means for blanking, or to hold a work piece clamped against a support while it is being shaped by said ram, means for admitting fluid to said cylinder, means responsive to a movement of said ram relative to said blankholder means for creating pressure in said cylinder, relief means associated with said cylinder and operable to relieve pressure therefrom in excess of a predetermined pressure, pressure responsive means responsive to a predetermined pressure on said advancing means for initiating a retraction stroke of said ram, means making said relief means and said pressure responsive means ineffective during a first portion of the advancing movement of said ram to thereby cause said blankholder means to actuate said shearing means for blanking, control means for making said relief means and said pressure responsive means effective during a second portion of the advancing movement of said ram, to thereby allow relative movement of said ram and said blankholder means, and control mechanism for controlling said control means in response to the travel of said ram.

15. In a press system, a reciprocable press platen having associated therewith fluid operable advancing and retracting means, a press plunger operable by said platen for shaping a work piece, a cylinder in said platen, a piston reciprocable in said cylinder and connected with blankholder means, means for admitting fluid into said cylinder, means for trapping the fluid in said cylinder to hydraulically interlock said platen and said blankholder means, blanking means operable by said blankholder means for cutting a work piece to size, controlling means operable to hydraulically interlock said platen and said blankholder means while said platen is being advanced, means operable automatically near the end of said blanking operation to allow relative movement of said platen and said blankholder means to cause the latter to clamp the blanked work piece against a support, and means preventing clamping pressure on said blankholder platen in excess of a predetermined pressure lower than the pressure exerted upon said blankholder means during said blanking operation.

16. In a press system, a press plunger for shaping a work piece, motor means for selectively advancing and retracting said plunger, blankholder means operable selectively to actuate blanking means for cutting a work piece to size, or to clamp a work piece against a support while it is being shaped by said plunger, actuating means responsive to the movement of said press plunger to actuate said blankholder means, means for interlocking said plunger and said blankholder means to cause the latter to actuate said blanking means at a higher pressure in response to the advancing movement of said plunger, and means operable automatically at about the completion of said cutting operation to unlock said plunger and said blankholder means to thereby allow relative movement between said plunger and said blankholder means and also to allow said actuating means to exert on said blankholder means a clamping pressure lower than said high pressure for clamping said work piece against said support.

PAUL E. FLOWERS.
WALTER ERNST.
HOWARD F. MacMILLIN.